United States Patent
Sathianathan et al.

(10) Patent No.: US 12,430,556 B2
(45) Date of Patent: Sep. 30, 2025

(54) LARGE LANGUAGE MODULES IN MODULAR PROGRAMMING

(71) Applicant: ITERATE STUDIO, INC., Highlands Ranch, CO (US)

(72) Inventors: Brainerd Sathianathan, Morgan Hill, CA (US); Arulkumaran Chandrasekaran, Tamil Nadu (IN); Shomron Jacob, San Jose, CA (US)

(73) Assignee: ITERATE STUDIO, INC., Highlands Ranch, CO (US)

( * ) Notice: Subject to any disclaimer, the term of this patent is extended or adjusted under 35 U.S.C. 154(b) by 7 days.

(21) Appl. No.: 18/518,007

(22) Filed: Nov. 22, 2023

(65) Prior Publication Data
US 2025/0165775 A1    May 22, 2025

(51) Int. Cl.
  *G06F 9/44*   (2018.01)
  *G06F 8/76*   (2018.01)
  *G06N 3/08*   (2023.01)

(52) U.S. Cl.
  CPC .................. *G06N 3/08* (2013.01); *G06F 8/76* (2013.01)

(58) Field of Classification Search
  CPC ........................................... G06F 8/76
  See application file for complete search history.

(56) References Cited

U.S. PATENT DOCUMENTS

| | | | |
|---|---|---|---|
| 10,416,996 B1* | 9/2019 | Samprathi | G06F 9/541 |
| 10,776,686 B1* | 9/2020 | Jacob | G06N 3/08 |
| 10,839,432 B1* | 11/2020 | Konig | G06Q 30/016 |
| 2014/0258363 A1* | 9/2014 | Peco | H04L 51/52 709/202 |
| 2023/0109411 A1* | 4/2023 | Poulsen | G06F 16/31 707/722 |

\* cited by examiner

*Primary Examiner* — Hang Pan
(74) *Attorney, Agent, or Firm* — Dorsey & Whitney LLP

(57) ABSTRACT

A system for creating functionality modules for deployment in a workflow for use in visual programming including a configuration server with a processing element operable to implement the functionality modules and workflow, at least one large language model, a customizable functionality module in a workflow including at least one interface defining one or more customizable properties, and wherein the workflow executes a first operational environment different from a second operational environment executed by the large language models.

20 Claims, 20 Drawing Sheets

LARGE LANGUAGE MODULES IN MODULAR PROGRAMMING

CROSS-REFERENCE TO RELATED APPLICATIONS

This application is related to U.S. Pat. No. 10,776,686 entitled "Container Architecture for Modular Machine Learning," filed on 22 Nov. 2019, and U.S. Provisional Patent Application No. 62/897,490 entitled "Modular Machine Learning and Artificial Intelligence," filed 9 Sep. 2019, both of which are hereby incorporated by reference in their entireties.

TECHNICAL FIELD

The technology described herein generally relates to modular systems and methods for developing and deploying artificial intelligence solutions.

BACKGROUND

Artificial intelligence ("AI") and machine learning ("ML") capabilities are increasingly sought to improve computer systems to enable them to perform more tasks in practical applications such as driving business efficiency, finding trends in data, and interacting with customers. However, utilizing artificial intelligence in a system may require large amounts of time or system memory to develop or deploy. Further, incorporating artificial intelligence into a system may require highly skilled personnel with experience in integrating artificial intelligence solutions into a system. Accordingly, there is a need for systems utilizing artificial intelligence that demand less memory, time, or expertise to develop.

SUMMARY

In one example, a system for creating functionality modules for deployment in a workflow for use in visual programming is disclosed. The system includes a configuration server with a processing element operable to implement the functionality module and workflow, at least one large language model, a customizable functionality module in a workflow including at least one interface defining one or more customizable properties, and wherein the workflow executes a first operational environment different from a second operational environment executed by the large language models.

In some examples, the system includes a shared memory including a language bridge in communication with the workflow and configured to interpret between the first operational environment and the second operational environment.

In some examples, the customizable functionality module is a large language model intent analyzer.

In some examples, the large language model intent analyzer analyzes an input for an intent to determine the detected intent, generates a predetermined response based off the detected intent, and wherein the predetermined response is a message generated by the large language model or a transfer of the input to a human operator.

In some examples, the customizable functionality module is a question answer module.

In some examples, the question answer module identifies content of an input, compares the content to a list of required information, and generates a prompt requesting a second input to include information of the list of required information not detected in the content.

In some examples, the customizable properties are defined by natural language text.

In some examples, the customizable functionality module is a prompt template generator, and the one or more customizable properties is a user prompt or system prompt.

In some examples, the customizable functionality module is a large language model manager and the one or more customizable properties define at least one characteristic of the large language model.

In some examples, the customizable functionality module is a large language model agent, and the large language model agent separates a requested task into one or more subtasks. In some examples, the one or more customizable properties define one or more of an agent type, a location of a large language model associated with the large language model agent.

In some examples, the customizable functionality module is a large language model memory module, and the one or more customizable properties define one or more of a type of memory, a memory size, or a type of content to be stored by the large language model memory module.

In some examples, the large language model data summarizer analyzes an input to the system for relevant information, and generates a summary of the input, wherein the summary maintains the relevant information.

In some examples, the customizable functionality module is a large language model intent analyzer, and the one or more customizable properties include a predetermined response to a detected intent of an input.

In one example, a system for creating a workflow for use in visual programming is disclosed. The system includes a configuration server with a processing element operable to implement the workflow, a vector database including source data stored in a numerical format, the workflow in communication with the vector database and including two or more large language models, and at least one functionality module, wherein the workflow executes a first operational environment different from a second operational environment executed by the large language models, and a shared memory including a language bridge in communication with the workflow and configured to interpret between the first operational environment and the second operational environment.

In some examples, the configuration server generates a workflow interface displayable at a user device, the workflow interface providing drag and droppable nodes graphically representing the two or more large language models or the at least one functionality module.

In some examples, the user interface includes one or more selectable filters or properties defining a characteristic of at least one of the two or more large language models.

In some examples, the source data is initially in a stored in a natural language format, the system automatically converting the source data to the numerical format.

In some examples, one of the first or second operational environments include machine readable instructions incompatible with the other of the first or second operational environments.

In some examples, at least one of the two or more large language models are selectively implemented by a private device or a public device.

In some examples, the at least one functionality module generates a user interface displayable at a user device, the user interface to receive an input from the user device.

In some examples, one of the two or more large language models generates an output received as an input at the other of the two or more large language models.

In some examples, the large language model is in communication with the vector database, the large language model comparing an input to the source data in the numerical format.

In some examples, the shared memory includes two or more virtual environments, and two or more conflicting libraries, wherein the two or more conflicting libraries are separately stored in the two or more virtual environments.

In one example, a method for generating an executable workflow with visual programming is disclosed. The method includes displaying a workflow interface at a user device, the workflow interface including nodes representative of large language models or functionality modules, placing a first node representing a first large language model into the executable workflow, automatically loading a language bridge to a shared memory accessible by the first large language model, and placing a second node representing a second large language model into the executable workflow, the second large language model accessing the shared memory and the language bridge.

In some examples, the first language model and the second language model operate in a first operational environment incompatible with a second operational environment of the workflow, and the language bridge interprets between the first operational environment and the second operational environment.

In some examples, the method includes uploading source data to a system executing the workflow, and automatically converting the source data to a vector in a vector database, the vector database in communication with either or both the first large language model or the second large language model.

In some examples, the method includes training either of the first large language model or the second large language model with the vector database.

In some examples, the method includes generating an output by the first large language model, and communicating the output to the second large language model as an input to the second large language model.

In some examples, the method includes, after placing the first node representing the first large language model, automatically determining if the shared memory includes the language bridge.

In one example, a system utilizing a plurality of large language models in a workflow. The system includes a first large language model operating in a first operational environment, a second large language model operating in the first operational environment, a workflow including the first large language model and the second large language model, the workflow operating in a second operational environment incompatible with the first operational environment, and a shared memory including a language bridge accessible by both the first large language model and the second large language model, the language bridge interpreting between the first and second operational environments.

In some examples, the system automatically generates the language bridge in response to the first large language model being added to the workflow.

In some examples, the system automatically determines whether a language bridge is present in response to the second large language model being added to the workflow.

In addition to the exemplary aspects and embodiments described above, further aspects and embodiments will become apparent by reference to the drawings and by study of the following description.

DETAILED DESCRIPTION

Figure 1:
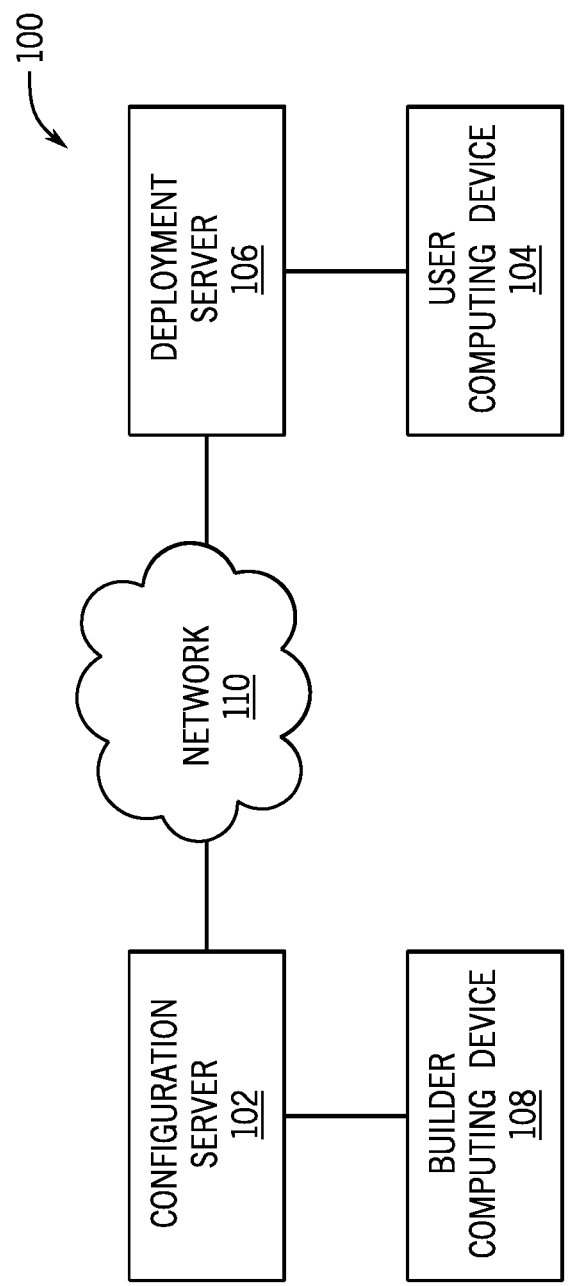
FIG. 1 illustrates a diagram of a modular graphical system that can be used to create and deploy multiplatform based programming applications or workflows.

Systems and methods described herein may be utilized for developing and deploying artificial intelligence ("AI") and machine learning ("ML") solutions. In one embodiment, the system includes a configuration server that interacts with a user device associated with a user to enable the user to develop and deploy executable applications by placing and connecting functionality modules into a workflow, a drag-and-drop user interface or other type of visual programming interface. The functionality modules define self-contained executable components that receive inputs from other connected functionality modules, execute desired functionality, and may then output data related to the processed inputs to other connected functionality modules. The functionality modules or models are connected so that inputs into a respective module are translated into a desired language, format, or the like, allowing the functionality modules to receive various types of inputs from various other functionality modules, without requiring specialized programing.

The functionality modules may include, represent, or be associated with large language models to implement or execute portions of the workflow. The large language modules (LLMs) may be similarly deployable by the drag-and-drop user interface. The user interface may provide customization of one or more features or properties of the LLMs. Various properties of the LLMs may be abstracted to common features across multiple LLMs. For example, features or properties providing similar functions or changes to multiple unique LLMs may be abstracted to common features among multiple LLMs. By abstracting the properties of the LLMs, LLMs may be customized or selectively deployed to develop workflows or applications with less cost, time, or training for developers. In some examples, the functionality modules may represent or be associated with computing elements or components to selectively execute portions of the workflow or application at various devices. For example, a location of a memory device or storage, processing elements, displays, or other devices to execute or perform portions of the functionality modules, LLMs, workflow, or application may be selectable. The customization of the properties of the functionality modules, LLMs, or computing elements may provide for efficient or cost effective deployment, updates, or integrations of the system.

In some examples, two or more features of the application or workflow may execute or operate in two or more computing or operational environments (e.g. machine language). For example, the system may be arranged such that the workflow executes a first operational environment, such as JavaScript, different from a second operational environment executed by one or more of the large language models, such as python. To reduce memory consumption, the system may include a shared memory including a language bridge to interpret between the operational environments (e.g., to translate commands, data, operations, and/or other communications between programming languages). The shared memory may be utilized by each large language model placed in the workflow, reducing the amount of data copied or generated by the system. For example, to communicate data between a first large language model to a second large language model, the data may be transmitted to the shared memory by the first large language model. The second large language model may then access the data from the shared memory. Such a shared memory reduces the amount of memory used compared to conventional solutions, which generally require copying of data to new memory locations. By reducing the amount of memory used, the system may deploy more complex solutions while using less memory.

The systems and methods disclosed in this application improve upon U.S. Pat. No. 10,776,686 by utilizing large language models in a drag and drop programming system. The drag and drop programming system disclosed herein reduces memory requirements to utilize large language models. For example, the system may automatically generate language bridges for communicating between programming languages or operational environments used by the large language models and the other executables of the system. Further, many users may not understand the complicated architecture and data configuration requirements for AI models, such as large language models. The system and methods described herein may enable almost any user (regardless of computer programing skill) to set up and utilize various AL models, while also creating an efficient manner of utilizing data across or for different models.

In some examples, the systems and methods may utilize or communicate with generative AI models to generate portions of applications or entire end-to-end application. The application may include either or both existing functionality modules, such as from a database of functionality modules, or functionality modules generated by the system arranged into a workflow defining the application. The generative AI models may assist in determining, or deciding, an arrangement of the functionality modules into a workflow to define the application. By utilizing generative AI models to assist in generating functionality modules or workflows, personnel with a lower proficiency in programming may develop or maintain various programming solutions. The systems and methods disclosed herein may also improve the efficiency of skilled personnel or enable more efficient oversight by the skilled personnel over solutions developed by an organization.

In some examples, executable applications or workflows that can be built with the disclosed systems and methods may include, without limitation: AI powered frequently asked question applications, AI/ML powered support for household appliances that provide information such as recalls and how-to-videos, voice enabled purchases, chatbots to interface with customers, confirmation of order status, comparison shopping of products by attribute, and loyalty programs with cryptocurrency rewards.

A user may develop solutions by placing functionality modules into a workflow interface, diagram, or visual interface, and connecting the functionality modules to define interactions and data communication therebetween. The system communicates data from the output of a first connected functionality module to the input of a second functionality module. The communication of inputs may be via messaging objects that pass between connected functionality modules to transmit data therebetween. The system automatically configures the communication to match the interface requirements of the functionality modules it connects, such that the functionality modules do not need to be programmed to be compatible, while still allowing the interconnection and operability therebetween.

A functionality module generally receives one or more inputs, executes a determined functionality based on the inputs and may provide one or more outputs. Inputs provided to a functionality module can be data such as numbers, letters, words, uniform resource locators ("URL"), usernames, passwords or other identifying information, queries, images, sounds, video, tactile, vibration, orientation, location, temperature, or other types of information. Inputs can also be events such as a meeting of a condition or the expiration of a timer. Inputs can be user actions such as clicking a link or opening a file, activating a sensor, or the like. Inputs can also be internet information requests or commands such as hypertext transfer protocol ("HTTP"), requests or commands such as POST, GET, and the like.

A functionality module can generate one or more outputs. However, some functionality modules do not generate outputs. Functionality modules can have outputs that are unused in a workflow. Outputs can be inputs to other functionality modules and thus can be similar to the inputs already described.

The functionality of the modules can be varied as needed but generally the modules use the inputs to perform a task or accomplish some result, such as running a programmed functionality, algorithm, or code with the inputs. The functionality of a functionality module can be a computer readable instruction operable to be executed by a processing or compute element such as a central processing unit (CPU) or a graphics processing unit (GPU). The functionality can be executed on more than one processing element. The processing elements can be in a single device such as a server, desktop computer, laptop, and/or personal user device like a phone. The processing elements that execute the functionality of a functionality module can also be distributed across more than one device, such as servers connected in a server system, or servers connected via a network such as the internet, a cell phone network, virtual private network ("VPN"), or other network.

Systems and methods disclosed herein generally allow for the connection and communication of multiple functionality modules, so that a user can easily build an integrated and expansive tool that accomplishes a variety of tasks. For example, a functionality module can take an action based on an input, such as authenticating a user's identity given inputs of a username and password. As another example, a functionality module can manipulate the input, such as by producing a vector space from a corpus of text received as an input. Other examples include: performing a calculation based on an input, such as generating an authentication token based on a user's identity, application program interface ("API") that interfaces with a service, function, website, database, or even a company.

In some instances, a functionality module may reconfigure based on an input. For example, a functionality module including or utilizing a neural network may receive and process training data and may therefore reconfigure (e.g., update) based on the training data provided as input. Some functionality modules enable enterprises-as-a-service, such as services via an API available from companies like Google, Amazon, Facebook, Salesforce, Linked-in, and Twitter. Other functionality modules enable the use of startups-as-a-service, such as search capabilities from company 1, shipment tracking from company 2, text analysis from company 3, and e-commerce optimization from company 4. Other functionality modules can include AI and/or ML capabilities such as nodes to classify data or objects, textual analysis such as term frequency-inverse document frequency analysis reflecting the importance of a word to a document, decision trees, principal component analysis, multi-layer perceptrons to create artificial neural networks, audio to text transcription, simulated annealing to find an optimal solution to a problem, optical character recognition, a Bayes classifier to classify text into categories, provide sentiment for a user input and categorize the sentiment, support-vector machines to analyze data used for regression analysis and classification, neural classification of strings or images, logistic regression, k-means clustering to cluster data, and/or other AI/ML capabilities. Some functionality modules create recommendations (e.g., product recommendations) based on the similarity between users, or user desires, for example by using a k-nearest neighbors algorithm. For example, such functionality modules can accept parameters such as user identification, data related to an item the user wants to use or purchase, the number of recommendations (e.g., for similar products) that the user wants, and other user options; and outputs results such as recommendations for other products the user may want. Other functionality modules can extract information associated with a user, such as, name, location, email address, phone number, dates, money, and organization (e.g., employer or school) associated with the user. Other functionality modules can filter inputs to determine whether a message is spam or not spam, for example, using a Bayes classifier or other models.

A user can control various inputs, such as by choosing which filtering model to use, how to label the resulting categories (e.g., good/bad) and set threshold values. Other functionality modules can find an optimal solution to a given problem, for example, by using a hill climbing algorithm. Other functionality modules can cross validate various classifiers, for example for consistency of results with a given set of inputs. Some functionality modules can supply messaging capabilities for interacting with users. Some functionality modules interface with data services such as databases like mySQL, postgreSQL, Mongodb, and Amazon S3. Other functionality modules provide basic software components such as PUT, GET, and POST messages, HTTP delivery, and email manipulation. Other functionality modules can supply blockchain capabilities, to, for example, authenticate users and/or transactions.

In some instances, the functionality modules execute their executable function in different operational environments from one another, where the environments may, or may not, be compatible with one another. For example, one functionality module can execute its functionality in a python 2.7 environment, adapted for flexibility. Another functionality module could execute its functionality in a machine language environment, adapted for speed.

The functionality modules can operate in a container or other defined packages, allowing interconnection between non-compatible modules. A container can contain a single functionality module or a container multiple modules. Containers can be physical or hardware defined containers, such as a server, or multiple servers, including one or more processing elements that execute one or more functionality modules. Containers may also be virtual, or a combination of physical and virtual. Virtual containers can be separate threads, executables, memory spaces, consoles, environments, shells, or virtual machines operating on one or more computing devices that execute the functionality of one or more functionality modules.

Returning to the example functionality module using a python 2.7 environment, in this example, the module may provide a functionality of natural language processing ("NLP") to analyze human language data and could execute, for example, in a virtual container like a shell (e.g., a command line interpreter) executing a python 2.7 interpreter on a processing element such as a CPU adapted to execute generalized computer instructions.

Returning to the example of a functionality module adapted to execute its functionality in a machine language environment, that functionality module could provide functionality such as image recognition using a neural network. This functionality could use a large number of parallelized calculations compatible with a physical container such as a server with one or more GPUs with a large number of parallel processing elements. Such functionality could also operate in a virtual container such as a scalable cloud computing service. Containers can be nested, such that a physical container, like a server, can contain one or more virtual containers. A virtual container such as a cloud computing resource can contain one or more physical containers, such as servers.

In the systems disclosed herein, a processing element can provide an interface to a user, displaying a variety of functionality modules representations, e.g., icons, textual representations, graphical objects, nodes, connecting lines, or the like. The interface can include a graphical interface and the capability to receive user inputs and generate outputs to interact with the user. The interface allows a user to select and place a node. Additionally, through the interface a user can configure connections between different nodes, thereby communicatively connecting different functionality modules. Such connections can be made graphically for instance by clicking and dragging a connector from an output of a node to an input of another node. Such a connector can be represented graphically as a line and can represent a messaging object configured to interface the output of a functionality module to the input of another functionality module.

In one example, a user designs a modular multiplatform based programming workflow or application by dragging and dropping nodes, representing functionality modules, into a workflow, and connects the nodes graphically, defining messaging objects between the nodes. The workflow can be deployed by a deployment server, such as a customer server, where other users can interact with the solution deployed to the deployment server with a user device, such as a computer, laptop, tablet, or smart phone.

In some examples, the systems or platforms disclosed herein may communicate with, or utilize various generative artificial intelligence (AI) models to generate functionality modules as described above. A functionality module generator may be in communication with the generative AI models to generate functionality module having new or different functionalities from existing functionality modules.

The user may define the functionality in an input or generation request, such as at an interface displayed on a user device. The generation request may be in the form of an input string. The input string may be transmitted or communicated to the functionality module generator, such as over a network. An input string, in some examples, may be generated based on text input, voice or other audio input, or other methods of providing input to the user device.

The functionality module generator may include a translation model designed to interpret the generation request in the form of the input string. The translation model may perform natural language processing ("NLP") to analyze human language data. For example, the translation model may analyze the input string to determine relevant features or aspects of the generation request such as an intended machine language for the generated functionality module, or various intended outputs or inputs to the functionality module. The translation model may convert the input string into structured or semi-structured data. The structured or semi-structured data may then be communicated to the generative AI models. By interpreting or structuring the generation request, the generative AI models may receive a clearer or more organized input that may result in improved outputs from the generative AI.

Generative AI models generally include systems using neural networks that analyze or process data to identify the patterns and structures within the existing data to generate new or original content. For example, the generative AI models may analyze existing functionality modules or other computer systems to generate new functionality modules. The generative AI models discussed herein may be included in or separate from the systems described herein. Various generative AI models may be used for different generation requests. The functionality module generator may select AI models to use based on the generation request or information gathered from the translational model. In some examples, communication with the generative AI models may include multiple communications or transfer of data between the system and the AI models.

The generative AI models may generate functionality modules in their entirety. In some examples, the generative AI models may generate a portion of the functionality modules and the functionality module generator may add additional features to the functionality module. For example, the generative AI model may define or generate the executable functionality of a generated functionality module, while the functionality module generator may additionally configure the functionality for operation with other functionality modules, such a configuring the module to receive a messaging object. The functionality module generator may also configure the generated functionality module to be displayable in a user interface, such as on a user device. The functionality module may be selectable (e.g. drag and droppable) within the interface. The drag and drop interface may assist in quick or efficient deployment of solutions.

In some instances, the systems or platforms disclosed herein may utilize or communicate with various generative artificial intelligence models to generate applications defined by workflows including multiple functionality modules responsive to a request from a user. The applications or workflows generated by the system may define end to end solutions. In other examples, the generated applications or workflows may be subsets of a larger application and the subset may perform a portion of the tasks of the larger application.

The application or workflow may be generated by an application generator in communicate with generative AI models. The application generator may include a functionality module generator, which may be similar to the functionality module generator previously discussed, and/or a workflow generator. The application generator may similarly receive a generation request. In some examples, the generation request may be received in the same manner as the generation request for a functionality module discussed above. For example, the application generator may determine whether an individual functionality module is requested or a workflow by analyzing the input string. In other examples, the user interface for defining a generation request may be different for a functionality module as compared to generating an application or a workflow.

The workflow generator may arrange multiple functionality modules into an arrangement or executable workflow. The workflow generator may include similar features as the functionality module generator, such as a translation model to interpret the generation request from the user. The workflow generator may analyze the inputs, outputs, or messaging objects of the functionality modules to determine which functionality modules to use to define a workflow. The workflow generator may communicate with the generative AI models to determine or assist in the arrangement or analysis of the functionality modules to define a workflow. The generative AI models in communication with the application generator and/or workflow generator may be the same or similar to the generative AI models discussed above with reference to the functionality module generator.

Responsive to a user request or generation request to generate a workflow, the application generator and/or the generative AI models may generate a workflow by determining an arrangement of functionality modules required to define the workflow. The system may use either or both generated functionality modules and existing functionality modules to generate the workflow. For example, the system may generate functionality modules necessary to create the workflow. In some examples, the system may analyze preexisting functionality modules and arrange the existing functionality modules to define the workflow. In other examples, the system may use preexisting functionality modules and generate functionality modules where necessary to complete the workflow.

In some examples, the system may utilize machine learned or AI models, such as in the form of large language models, to generate one or more outputs in response to one or more inputs. The system may include a drag and drop programmable workflow including functionality modules and the large language models. For example, the large language models may be placed, similar to functionality modules, in a workflow. In some examples, the functionality modules may generate calls to or represent large language models. The system may include source data relevant to the input. The system may automatically convert the source data to a vector database in communication with the large language models. The large language models may be in communication with or trained with the vector databases to reduce the time or memory to utilize the large language models in the workflow.

In some examples, the system may be executed on a variety of hardware. For example, the one or more CPUs, GPUs, servers, memory devices, or the like may be selectable to execute one or more portions of a workflow. The workflow may include one or more drag and drop programmable compute modules representing the various computing devices. The compute modules may be similar to or represented by functionality modules in a workflow. By positioning compute modules in the workflow, the system may execute associated LLMs or functionality modules at the devices represented by the compute modules. By providing selectable compute modules, hardware components may be selected that reduce cost, execute the operations more efficiently, or hardware may easily integrated or upgraded by the system.

In some examples, the system may include functionality modules associated with or representative of the large language models or generative AI models. The functionality modules may be displayable in a user interface. The functionality modules may include one or more customizable properties to assist a developer in quickly deploying a workflow or programmed solution. In some examples, the functionality modules may include user interfaces to display or customize the customizable properties. The user interfaces may receive natural text inputs to define or adjust the one or more customizable properties or filters. In some examples, the compute modules may have customizable properties or user interfaces. For example, a compute module or a functionality module representing a compute module may include properties to select a location or type of computing hardware such as a GPU, CPU, server, memory device, or the like. Accordingly, processes or solutions may be developed with less time or skill.

Turning to FIG. 1, a modular graphical system 100 for developing and deploying multiplatform based programming applications or workflows will now be discussed. The system 100 includes one or more configuration servers 102, one or more builder computing devices 108, one or more deployment servers 106, and one or more user computing devices 104. The devices of the system 100 may be in communication with one another via a network 110, which may be any type of data transmission or communication mechanisms or multiple mechanism, such as, but not limited to, WiFi, Bluetooth, Zigbee, wired communications, satellite, other types of radio wave, optical transmission methods, or the like. The builder computing device 108 may be receive inputs or generation requests from users to generate functionality modules or workflows. The configuration server 102 may be used to arrange or generate workflows and/or functionality modules. The user computing device 104 may receive inputs or requests from a user, such as an end user of an application. The deployment servers 106 may be in communication with, and receive inputs from, the user computing device 104 and execute functionality modules or workflows. The generative AI models and additional devices or systems may be in communication with devices and servers by the network 110.

The configuration server 102 can generally correspond to a configuring user such as a builder, developer, software provider, application services supplier, or the like, who builds applications for use by users, clients, consumers, or the like. The deployment server 106 may generally correspond to an organization, person, company, vendor or other provider that provides the multiplatform based programming application built by the configuring user. In various embodiments, the configuration server 102 and deployment server 106 can be the same physical or virtual server. In various embodiments the configuring user associated with the configuration server 102 and the provider associated with the deployment server 106 may be the same entity. It should be noted that although only a single device is shown for the category of devices, there may be multiple devices corresponding to the various parties and/or resources, e.g., the servers 102, 106 may include multiple computing resources that may or may not be in communication with one another.

The user computing device 104 and the builder computing device 108 may be substantially any type of electronic device that can receive and transmit data, such as, but not limited to, personal computer, laptop, smartphone, tablet, server, or the like. Similarly, the configuration server 102 and the deployment server 106 may be substantially any type of device that can receive and process information and may be a collection of one or more virtual processing elements (e.g., cloud computing, virtual machines, and the like) in communication with one another.

Figure 2:
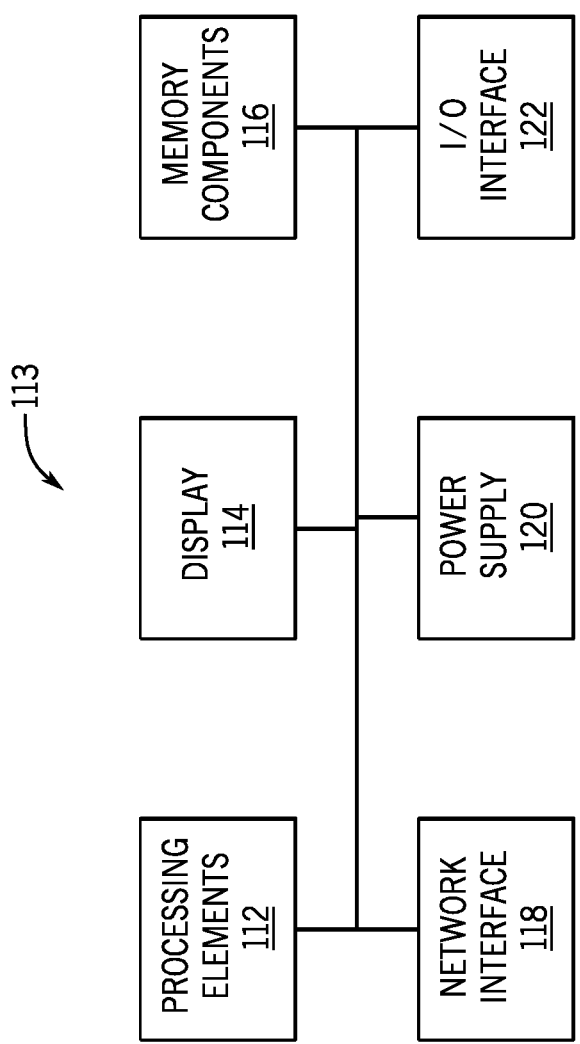
FIG. 2 illustrates a simplified block diagram of an example of computing devices incorporated into the system.

FIG. 2 illustrates a simplified block diagram for a computing device 113 that may be used to implement various devices of the system, such as the builder computing device 108, the user computing device 104, the configuration server 102, and/or the deployment server 106. As shown, the various devices may include one or more processing elements 112, a display 114, one or more memory components 116, a network interface 118, optionally power 120, and an input/output interface 122 where the various components may be in direct or indirect communication with one another, such as via one or more system buses, contract traces, wiring, or via wireless mechanisms.

The one or more processing elements 112 may be substantially any electronic device capable of processing, receiving, and/or transmitting instructions. For example, the processing elements 112 may be a microprocessor, microcomputer, graphics processing unit, or the like. It also should be noted that the processing elements 112 may include one or more processing elements or modules that may or may not be in communication with one another. For example, a first processing element may control a first set of components of the computing device 113 and a second processing element may control a second set of components of the computing device 113 where the first and second processing elements may or may not be in communication with each other. Relatedly, the processing elements 112 may be configured to execute one or more instructions in parallel locally, and/or across the network 110, such as through cloud computing resources.

The display 114 is optional and provides an input/output mechanism for the computing devices, such as to display visual information (e.g., images, graphical user interfaces, videos, notifications, and the like) to the user, and in certain instances may also act to receive user input (e.g., via a touch screen or the like). The display 114 may be a liquid crystal display screen, plasma screen, light emitting diode screen, an organic liquid emitting diode screen, or the like. The type and number of displays may vary with the type of devices (e.g., smartphone versus a desktop computer).

The memory components 116 store electronic data that may be utilized by the computing devices, such as audio files, video files, document files, programming instructions, and the like. The memory components 116 may be, for example, non-volatile storage, a magnetic storage medium, optical storage medium, magneto-optical storage medium, read only memory, random access memory, erasable programmable memory, flash memory, or a combination of one or more types of memory components. In many embodiments, the servers 102, 106 may have a larger memory capacity than the computing devices 104, 108, with the memory components 116 optionally linked via a cloud network or the like.

The network interface 118 receives and transmits data to and from the network 110 to the various computing devices 104, 108 and the servers 102, 106. The network interface 118 may transmit and send data to the network 110 directly or indirectly. For example, the networking interface 118 may transmit data to and from other computing devices through the network 110, which may be a cellular, satellite, or other wireless network (WiFi, WiMAX, Bluetooth) or a wired network (Ethernet), or a combination thereof. In some embodiments, the network interface 118 may also include various modules, such as an API that interfaces and translates requests across the network 110 to the specific local computing elements for the various computing devices 104, 108.

The various computing devices and/or servers 102, 104, 106, 108 may also include a power supply 120. The power supply 120 provides power to various components of the computing devices 102, 104, 106, 108. The power supply 120 may include one or more rechargeable, disposable, or hardwire sources, e.g., batteries, power cord, AC/DC inverter, DC/DC converter, or the like. Additionally, the power supply 120 may include one or more types of connectors or components that provide different types of power to the computing devices and/or servers 102, 104, 106, 108. In some embodiments, the power supply 120 may include a connector (such as a universal serial bus) that provides power to the device or batteries within the device and also transmits data to and from the device to other devices.

The input/output interface 122 allows the computing devices and/or servers 102, 104, 106, 108 to receive input from a user and provide output to the user. For example, the input/output interface 122 may include a capacitive touch screen, keyboard, mouse, stylus, or the like. The type of devices that interact via the input/output interface 122 may be varied as desired. It should be noted that the various computing devices may be in communication with a compute back end, such as the server 106 or a cloud provider, e.g., Google Cloud Platform, Amazon Web Services, Microsoft Azure, or the like.

Figure 3:
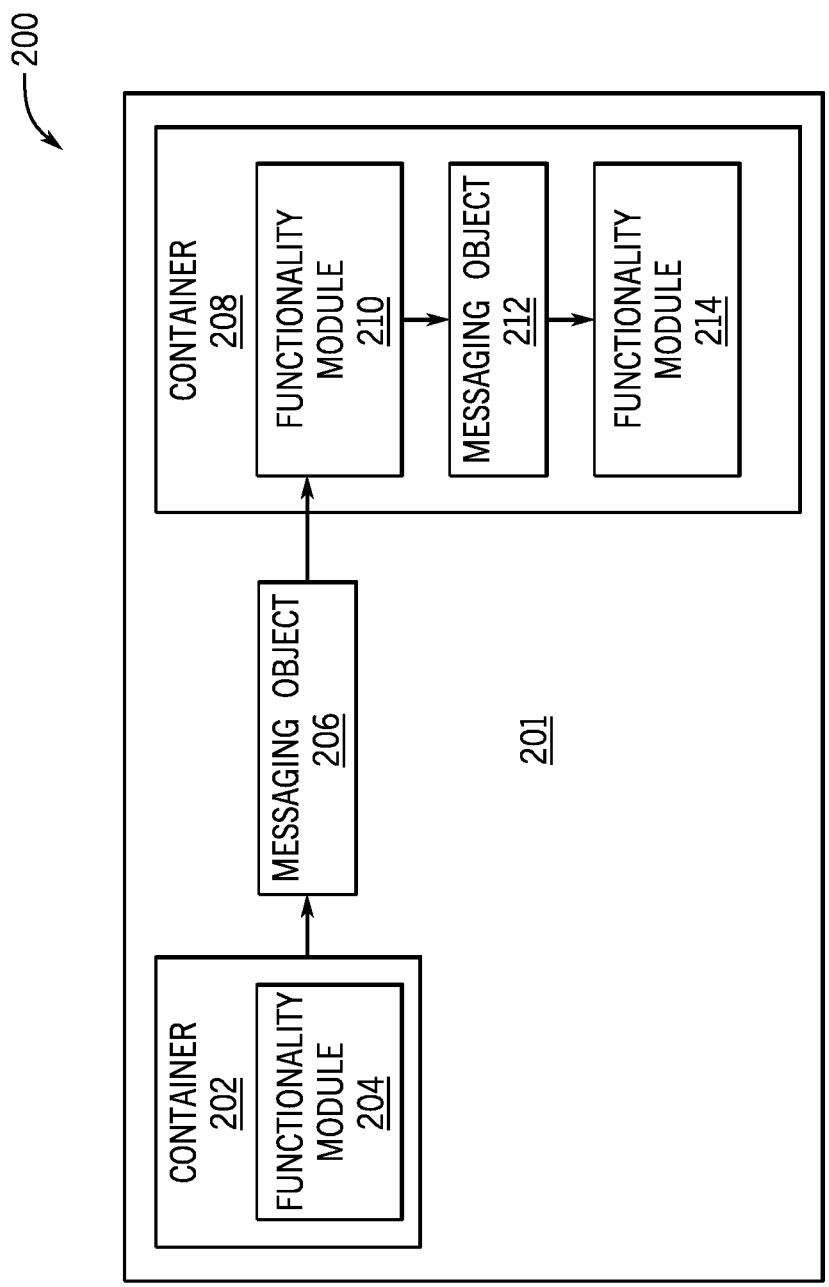
FIG. 3 illustrates a block diagram illustrating part of an example workflow created with the modular system of FIG. 1.

FIG. 3 illustrates a specific example of an AI/ML defined workflow 200, programmed by coupling functionality modules with messaging objects, as represented by a workflow diagram 201. The workflow 200 may define a multiplatform based programming application or process that can be deployed for use, such as on the deployment server 106, or other server. The application defined by the workflow 200 executes a first functionality module 204 that generates one or more outputs. The outputs of the first functionality module 204 are translated and passed by a messaging object 206, to the input of a second functionality module 210. The second functionality module 210 executes a second functionality using the output from the first functionality module 204. The second functionality module 210 generates one or more outputs, which are translated and passed by a second messaging object 212, to a third functionality module 214. The third functionality module 214 executes a functionality using the output from the preceding functionality modules, and may also generate one or more outputs. The functionality modules that execute may utilize the inputs to complete an analysis or other function, such as an AI/ML analysis, where the output of which is then provided to the next module for use as an input, which allows a user to easily incorporate and exploit AI/ML functionality.

In a specific example, the multiplatform based programming application defined by the workflow 200 executes a website that monitors user inputs and processes them through an NLP module to determine the topic to which a user's question relates. The application can then search for related subject matter and return related results to the user. In the example of FIG. 3, the workflow 200 is adapted to interface with a user such as a customer of a business with both online and outlet stores. The workflow includes a first container 202, which contains a first functionality module 204. The workflow 200 also contains a second container 208 that contains a second functionality module 210 and a third functionality module 214.

In the FIG. 3 example, the first container 202 is a virtual container executing a first environment, e.g., a python 3.7 interpreter. The first functionality module 204 within the first container 202 provides a first AI/ML functionality, e.g., NLP (also called natural language understanding or "NLU") functionality. The first functionality module 204 receives as an input a user query and converts the query into another form using the AI/ML framework. For example, the first functionality module 204 can convert the query into structured data with a high degree of organization or with a defined schema, such as a relational database. The first functionality module 204 can also convert the query into semi-structured data that does not have a pre-defined data model, or schema, or is not organized in a pre-defined manner, yet has some level or organization of the information such as in a hierarchy, categories, or groups of data.

As some examples of the conversion via the first functionality module 204, a user can start a conversation with a customer service chat function or bot by inputting a query such as, "Can I purchase gift cards on your website or in an outlet store?" Such a query can be received by a functionality module adapted to receive user queries and passed into the input of the first functionality module 204 (e.g., via the messaging object). In the example shown in FIG. 3, the first functionality module 204 converts the query text received from the first module into semi-structured data in a format such as JavaScript object notation ("JSON"), extensible markup language ("XML"), or the like. For example, the first functionality module 204 could output a JSON string such as, "{"intent": "buy_gift_card", "entities": {"location": {"website", "outlet"}}}," representing the input query in a semi-structured data format. In this example, the functionality module 204 interpreted the query text to determine that the user intends to buy a gift card, from either the company's website or an outlet store.

The first functionality module 204 could accomplish this functionality by using an AI/ML framework selected from among applicable AI/ML frameworks. Such frameworks could execute in a variety of operational environments, such as in machine language environments, interpreted environments, or scripted environments. The first container 202 can be selected to provide an appropriate environment for a selected AI/ML framework. In a specific example, an AI/ML framework providing the functionality of the first functionality module 204 could be a python package. More specifically, the AI/ML framework could be a package that runs in a python 3.7 interpreter or other environment and the first container 202 is selected to then define or provide a python 3.7 interpreter as the operating environment.

Generally, AI/ML functionality modules, such as the functionality module 204, may be trained to provide more accurate or meaningful results. In this manner, an input to the functionality module 204 can be a set of training data including natural language text queries from users and corresponding structured or semi-structured data resulting from analysis of that data. For example, the training data could be compiled from a list of frequently asked questions. The training data can be provided as a file, list, database, or other suitable format. Utilizing a set of queries and structured or semi-structured results can train the AI/ML of the functionality module 204 to recognize similar queries and parse them into structured or semi-structured data. The functionality module 204 can also accept a number of tuning parameters on its input as well, which can help customize and tailor the analysis of the queries. Tuning parameters can be used to set up or change the behavior of AI/ML functionality. In some specific examples, tuning parameters can optimize the inputs or outputs of neural or machine learning networks. Tuning parameters can change the learning rate of an AI/ML functionality, for example by changing the amount of learning from data received. Tuning parameters can change the error tolerance of an AI/ML functionality. Tuning parameters can also affect the weight or weight function of perceptrons in a neural network. In examples where an AI/ML functionality is a non-neural algorithm, the tuning parameters can affect support vectors. Additionally, the functionality module 204 can continually train itself as it is deployed to provide more meaningful results.

The system 100 may connect various functionality modules using messaging objects (e.g., the first messaging object 206). Messaging objects pass information from the output of one or more functionality modules to other functionality modules. A messaging object can be structured data in a database or semi-structured data in a format such as JSON or XML. A messaging object can have any set of properties desired to connect two functionality modules. In a preferred embodiment, a messaging object has a payload property representing the data being passed between functionality modules. A messaging object can also have a property such as a messaging identifier or ID that can be used to track the messaging object as it passes through a workflow. In the example of FIG. 3, the semi-structured data output from the first functionality module 204 can be passed to the input of the second functionality module 210 by first a messaging object 206. In the above example, the first messaging object 206 could have a payload property containing the JSON string, "{"intent": "buy_gift_card", "entities": {"location": {"website", "outlet"}}}." The first messaging object 206 could also have an ID such as "1234", that identifies the first messaging object 206 within the workflow 200. The first messaging object 206 can pass into the input of the second functionality module 210. The system 100 can configure a messaging object, such as the first messaging object 206 to connect to disparate functionality modules, such as between the first functionality module 204 and the second functionality module 210.

In this example, the second container 208 is a virtual container executing a second operating environment, e.g., a JavaScript interpreter. The second container 208 contains both the second and third functionality modules 210 and 214. The second container 208 could be, for example, a server side JavaScript engine running on a deployment server 106, a client side JavaScript engine embedded in a web browser on a user computing device 104, or another virtual or physical container. Because the second functionality module 210 is contained in the second container 208, it uses JavaScript to provide its functionality.

In this example, the second functionality module 210 is a script in JavaScript format adapted to parse the JSON data received from the first functionality module 204 on its input. However, the second functionality module 210 can implement any kind of JavaScript code or framework to operate on the first messaging object 206 passed into its input. In this example, the second functionality module 210 parses the JSON data and converts it to a query suitable to input into a search engine. The second functionality module 210 then passes the query, using a second messaging object 212, to the third functionality module 214. The second functionality module 210 could also modify the payload of the first messaging object 206 and pass it on to the third functionality module 214. Also, the second functionality 210 module can pass an array of messaging objects on its output, to one or more other functionality modules. The second functionality module 210 can also pass log messages, errors, or warnings to aide in debugging of a multiplatform based programming application or workflow developed using the system 100.

In the workflow 200, the third functionality module 214 has the functionality of interfacing with an API of a third-party search provider, separate from the system 100. The third functionality module 214 receives the search query from the second functionality module 210 on its input, via the second messaging object 212, sends the query to the third-party provider, and receives the search results. The third functionality module 214 can implement an API identifier and license key to identify to the third-party provider that the search is originating from the application defined by the workflow 200. The third functionality module 214 can also identify a pre-compiled index of search results against which to check the query (e.g., to increase the speed at which results are returned). The third functionality module 214, in this example, can implement its functionality in a JavaScript environment, and is suitable for residing in the container 208 also containing the second functionality module 210. The third functionality module 214 can output the search results returned from the third-party search provider to other functionality modules, such as via the payload object of a messaging function passed in its output. The third functionality module 214 can adapt, format, or further modify the results, or send to other functionality modules, ultimately to a functionality module that displays the results to the user, for example, by generating HTML for display by a web browser on a user device 104.

As can be understood, a messaging object is highly flexible and able to connect disparate functionality modules executing in different containers and thus different environments. The system 100 configures the messaging objects 206, 212 to adapt their data, payloads, and interfaces to match the format and data needs of the inputs and outputs of the various functionality modules deployed in a workflow 200. This flexibility of messaging objects allows the system 100 to include functionality modules of many different types, operating in different containers into a seamless multiplatform based programming application.

Figure 4:
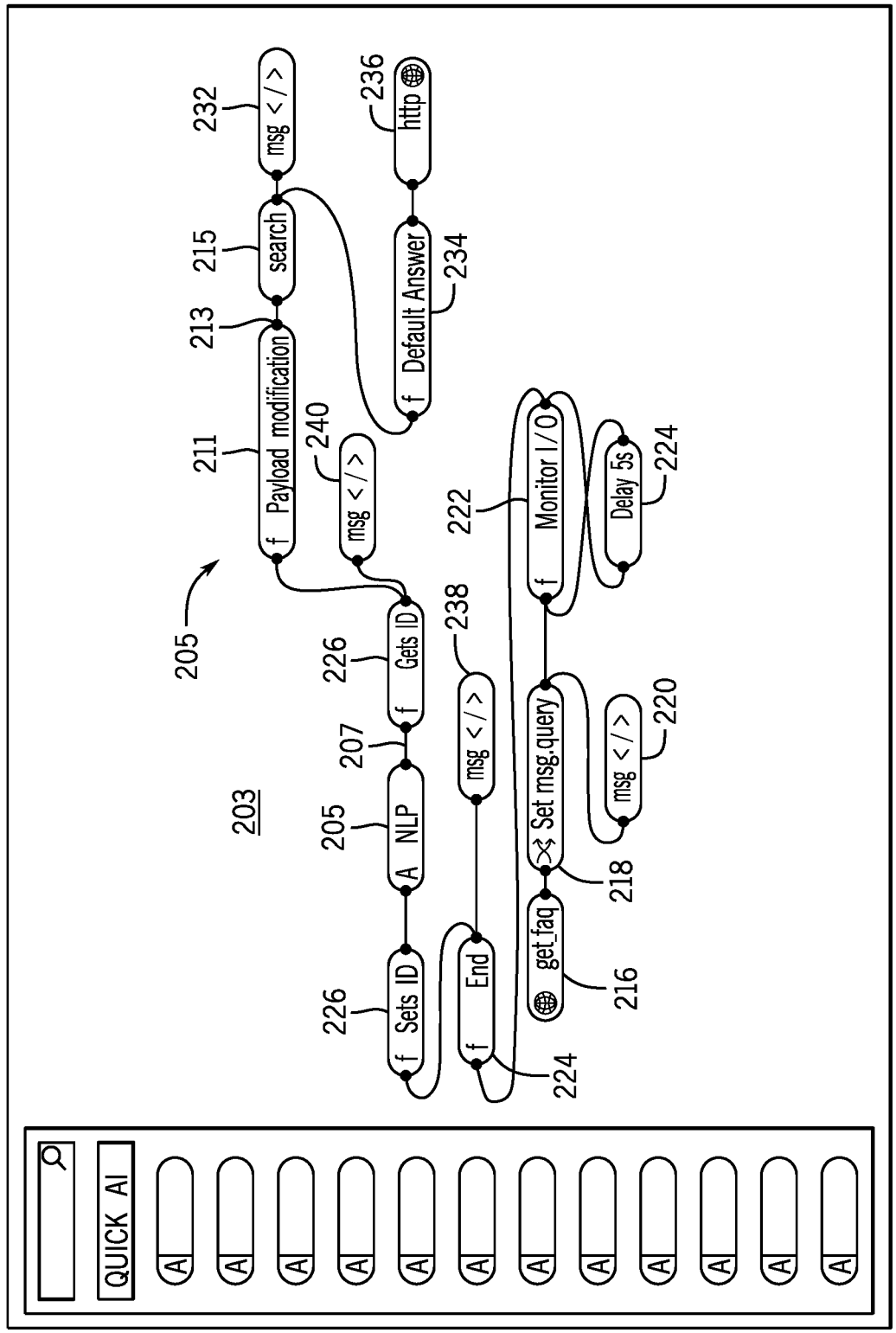
FIG. 4 illustrates a flow chart illustrating an example user interface of a workflow created with the modular system of FIG. 1.

FIG. 4 illustrates an example of a completed workflow 205, programmed by coupling functionality modules, represented by nodes, within a workflow interface 203 and connecting them with messaging objects. The completed workflow 205 workflow interface 203 may demonstrate or display a workflow structured similarly to the completed workflow 200 that can be built and executed via the system 100 or deployed as a multiplatform based programming application or process. The nodes may generally be graphical representations of the functionality modules. For example, nodes 205, 211, and 215 may represent functionality modules such as functionality modules 204, 210, and 214, respectively, as discussed above with respect to FIG. 3. Other examples of functionality modules represented graphically as the nodes can be similar to those already discussed, and implement the following functionality. Functionality module 216 implements an HTTP GET request, requesting an FAQ data set to train the functionality module 204 represented by node 205. Some functionality modules, which can use different and otherwise incompatible software and/or hardware environments, can operate within virtual containers on a server or on multiple servers. A node 218 representing a functionality module can set a user's search query in the payload of a messaging object. A node 222 representing a functionality module can monitor the user input to provide results as the user types. A node 224 representing a functionality module can implement a delay for the first request on the search engine of functionality module 214, to allow the user to type a meaningful amount of the query for an initial search. A node 226 representing a functionality module can set an ID for the messaging object 206. Similarly, a node 228 representing a functionality module can retrieve the ID of the messaging object 206. A node 234 representing a functionality module can further manipulate the search results received from the third-party search provider whose API is interfaced via the functionality module 214 represented by node 215, for example using JavaScript code to provide response logic, filtering, and error handling. A node 236 representing a functionality module can output the search results to the user by generating HTML code for display on a user device 104. The node 224 representing a functionality module can end the workflow 200. Nodes 220, 232, 238, and 240 representing additional functionality modules may be optional debug messaging functionality modules.

Figure 5:
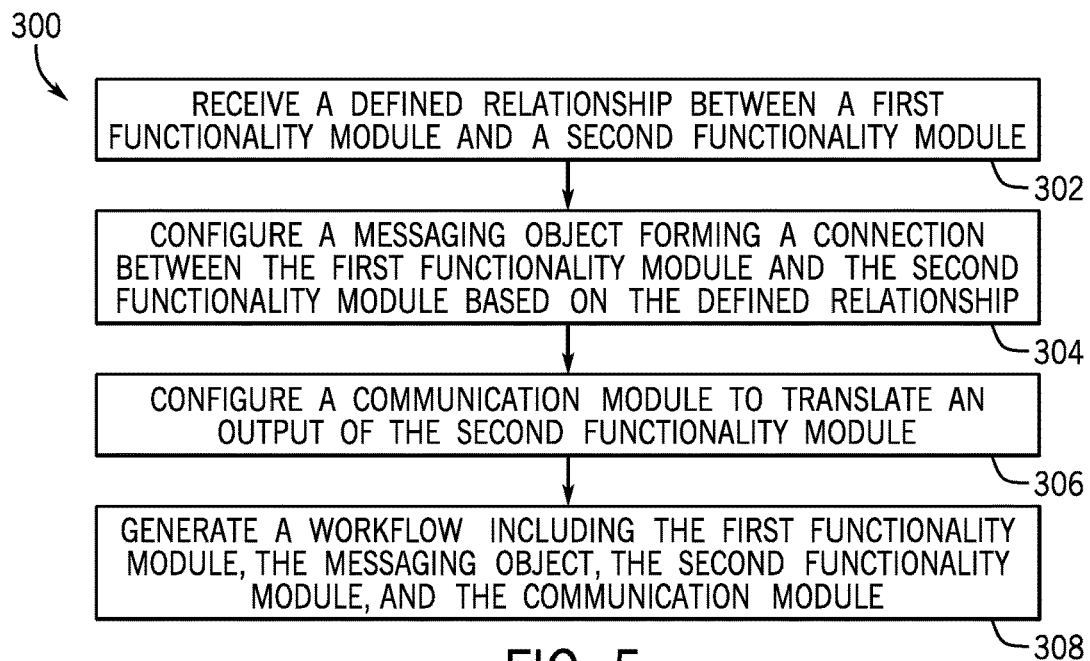
FIG. 5 illustrates a flow chart illustrating a method of building a workflow, using the system of FIG. 1.

FIG. 5 illustrates a method 300 of building a multiplatform based programming application or workflow, like the solutions described for example, in FIGS. 3 and 4. The method 300 can be executed by a processing unit on a server, such as the configuration server 102, or processing units on other computing devices. The operations of the method 300 may be performed in alternative order from that presented without deviating from the present disclosure.

The method 300 may begin in operation 302 and the configuration server 102 receives a defined relationship between a first functionality module and a second functionality module. For example, the configuration server 102 may receive information regarding the data inputs and outputs of various functionality modules, as well as their formats, and operating environments. For instance, returning to the examples of FIGS. 3 and 4, the configuration server 102 may receive configuration information for the functionality module 204 indicating that its input needs a natural text query, training data, and tuning parameters, and that its output is a structured or semi-structured data set. For example, a user can define connections between functionality modules in the workflow 200 using the workflow interface 203 by connecting functionality modules with connectors or lines. Likewise, the configuration server 102 may receive configuration information that the functionality module 210 takes a structured or semi-structured data set as its input and parses that data set into an object compatible with a third-party search engine. Other relationships between other functionality modules can be similarly configured.

The method may proceed to operation 304 and the configuration server 102 may configure a messaging object forming a connection between the first functionality module and the second functionality module based on the defined relationship. For instance, the configuration server 102 can configure a messaging object to pass the output from the functionality module 204 to the functionality module 210. The configuration server 102 can accomplish this configuration by using the defined relationships between functionality modules received in operation 302 to add or remove properties from messaging objects passing between the various functionality modules. A messaging object can be readable by the functionality modules to which it is connected. When functionality modules are connected by a messaging object, the functionality modules can be aware of the other functionality modules to which they are connected. For example, a functionality module whose output or input is connected to a messaging object can perform a scan to determine what other functionality modules are connected and change parameters in the messaging object accordingly. If a functionality modules whose output is connected to a messaging object (a sending functionality module) that has an established configuration for a messaging object, it can configure the messaging object accordingly. Functionality modules can also dynamically determine the appropriate configuration of a messaging object based on rules that determine how to configure connected functionality modules.

The method 300 may then proceed to operation 306 and the configuration server 102 configures a functionality module to translate an output of the second functionality module. For example, the configuration server 102 can translate the output of raw search results from the functionality module 214, by applying filtering and error handling logic as in the functionality module 234, for use by the functionality module 236 to display results to a user.

The method 300 may proceed to operation 308 and the configuration server 102 generates a workflow or process flow 200 including the first functionality module, the messaging object, the second functionality module, and the communication module. The workflow or process flow 200 may be executed for example by a deployment server 106. The configuration server 102 can assemble the defined relationships, the configured connections and outputs of the various functionality modules to create a multiplatform based programming application or process defined by the workflow 200. The configuration server 102, in operation 308, can also set up or implement the various containers needed to contain the functionality modules. For example, the configuration server 102 could configure instances of python and/or JavaScript interpreters to execute the functionality modules 204 and 210, 214, respectively.

Figure 6:
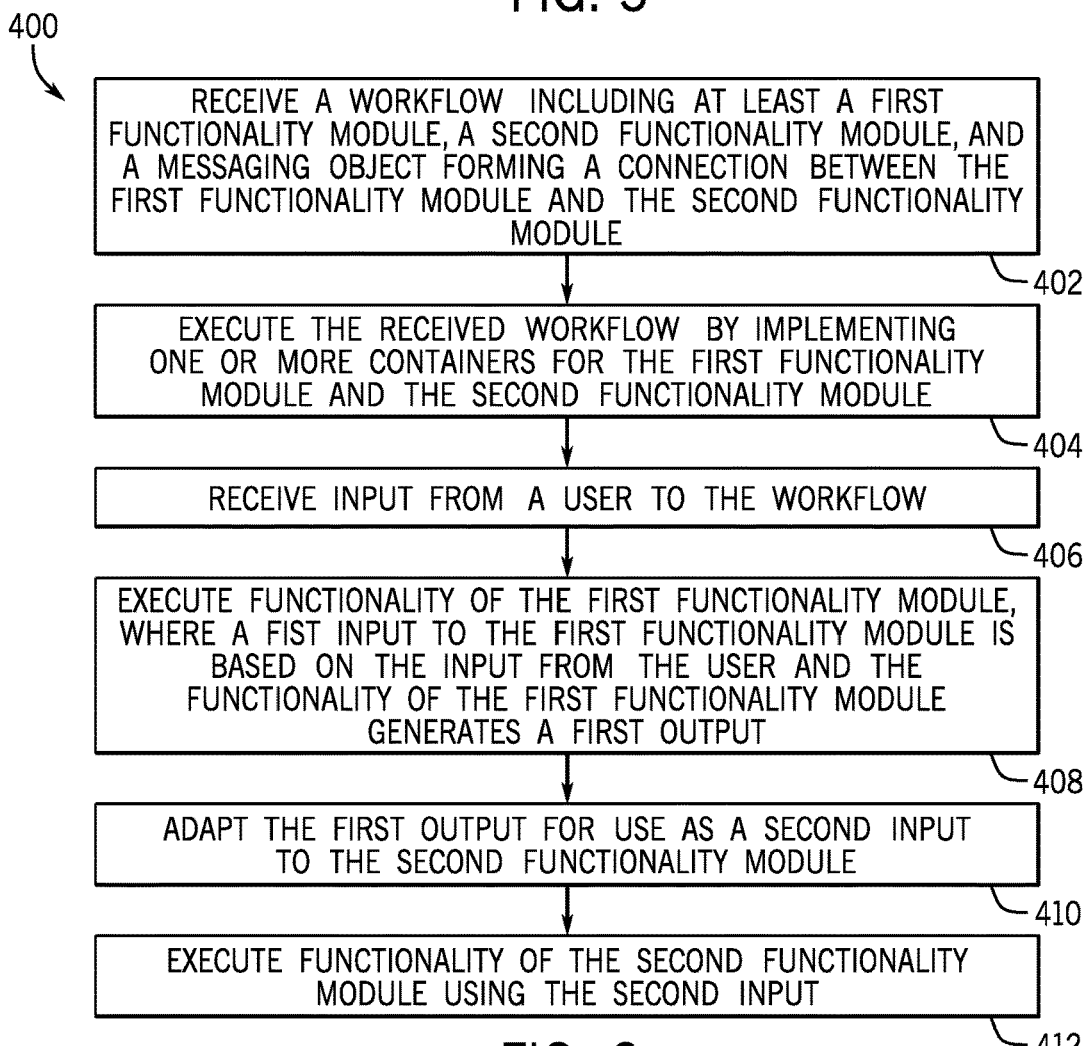
FIG. 6 illustrates a flow chart illustrating a method of executing a workflow, using the system of FIG. 1.

FIG. 6 illustrates a method 400 of deploying a multiplatform based programming application, like the solutions described for example, in FIGS. 3 and 4. The method 400 can be executed by a processing unit on a server, such as the deployment server 102, or processing units on other computing devices. The operations of the method 400 may be performed in different orders than those presented without deviating from the present disclosure.

The method 400 may begin with operation 402 and the deployment server 106 receives a workflow 200. The workflow 200 may include a first functionality module, a second functionality module, and a messaging object forming a connection between the first functionality module and the second functionality module. The deployment server 106 may receive a workflow from a configuration server 102. The workflow may be the output of the method 300, and may contain the defined relationships between functionality modules. The workflow may contain the configurations of the connections between functionality modules, as represented, for example by the messaging objects 206 and 212 within the workflow or process 200.

The method 400 may then proceed to operation 404 and the deployment server 106 can execute the workflow received in operation 402. As part of operation 404, the deployment server 106 can set up and operate various virtual or physical containers to contain the functionality modules. Generally, functionality modules compatible with different interpreters will operate in different containers. To execute a received workflow including the first functionality module and the second functionality module, the deployment server 106 may implement a first container for the first functionality module and a second container for the second functionality module. For instance, the deployment server 106 may set up instances of python or JavaScript interpreters, or others, as previously described, to contain the functionality modules 204, 210, and 214, respectively, or other functionality modules. In some instances, where functionality modules are compatible with the same interpreter, the deployment server 106 may set up one virtual or physical container for multiple functionality modules.

The method 400 may then proceed to operation 406 and the deployment server 106 may receive an input from a user device 104 that may be an input to the workflow 200. The input may be, for example, text input, audio input, or input received through a graphical interface (such as a user selecting an icon corresponding to an input option). For example, the deployment server 106 can monitor the functionality module 218 of FIG. 4 for input related to a user FAQ search. The deployment server 106 can then pass that input to another functionality module, such as functionality module 204.

The method 400 may then proceed to operation 408 and the deployment server 106 executes the functionality of the first functionality module. For example, the deployment server 106 can execute the functionality of the functionality module 204, in a python 3.7 container, to perform NLP analysis of the user FAQ search to generate a first output. The deployment server 106 may execute the functionality of the first functionality module using available interpreters. The deployment server 106 may use available interpreters in conjunction with additional modules or libraries to handle allocation of tasks associated with a functionality module. For example, the resource based multithreading module disclosed in the U.S. patent application Ser. No. 16/692,941 entitled "Developer Independent Resource Based Multithreading Module," may be used in conjunction with a node.js execution environment to allocate execution of computationally intensive tasks among available processors.

The method may proceed to operation 410 and the deployment server 106 adapts the first output for use as a second input to the second functionality module. The deployment server 106 adapts the first output by executing a messaging object configured to pass information from the first functionality module to the second functionality module.

The method 400 may then proceed to operation 412 and the deployment server 106 executes functionality of the second functionality module using the second input. The deployment server 106 may then repeat operations 410 and 412 for remaining functionality modules and messaging objects in the workflow. Returning to the workflow 200 in FIG. 4, the deployment server 106 may execute the functionality of functionality modules 210-236, using messaging objects connecting functionality modules to format communications between functionality modules.

The method 400 may terminate, for example, once an output is delivered. Returning to the examples of FIGS. 3-4, configuration server 102 can generate raw search results from a functionality module, such as the functionality module 214. The deployment server 106 can also generate output from functionality module 236 to display final search results to a user via the user device 104.

Turning to FIGS. 7A-14, systems and methods for generating functionality modules and/or generating workflows including functionality modules by utilizing artificial intelligence (AI) models will now be discussed. The systems and methods may be used to improve on the information disclosed in U.S. Pat. No. 10,776,686 modular graphical system for developing and deploying multiplatform based programming applications or workflows. For example, the systems and methods disclosed herein may utilize generative AI to facilitate the development of programming solutions by personnel with less skill or improve the efficiency of personnel with a greater skill. The generative AI may also allow for custom tailored programming solutions to unique problems by allowing a user to generate functionality modules uniquely suited for a given problem or task.

The systems and methods disclosed herein may utilize similar devices or systems as disclosed above. For example, the systems and methods disclosed in FIGS. 7A-14 may include, be executed by, or in communication with one or more configuration servers 102, one or more builder computing devices 108, one or more deployment servers 106, and one or more user computing devices 104. The devices of the system 100 may be in communication with one another via a network 110. Various devices of the systems may include one or more processing elements 112, a display 114, one or more memory components 116, a network interface 118, optionally power 120, and an input/output interface 122 where the various components may be in direct or indirect communication with one another, such as via one or more system buses, contract traces, wiring, or via wireless mechanisms.

Figure 7A:
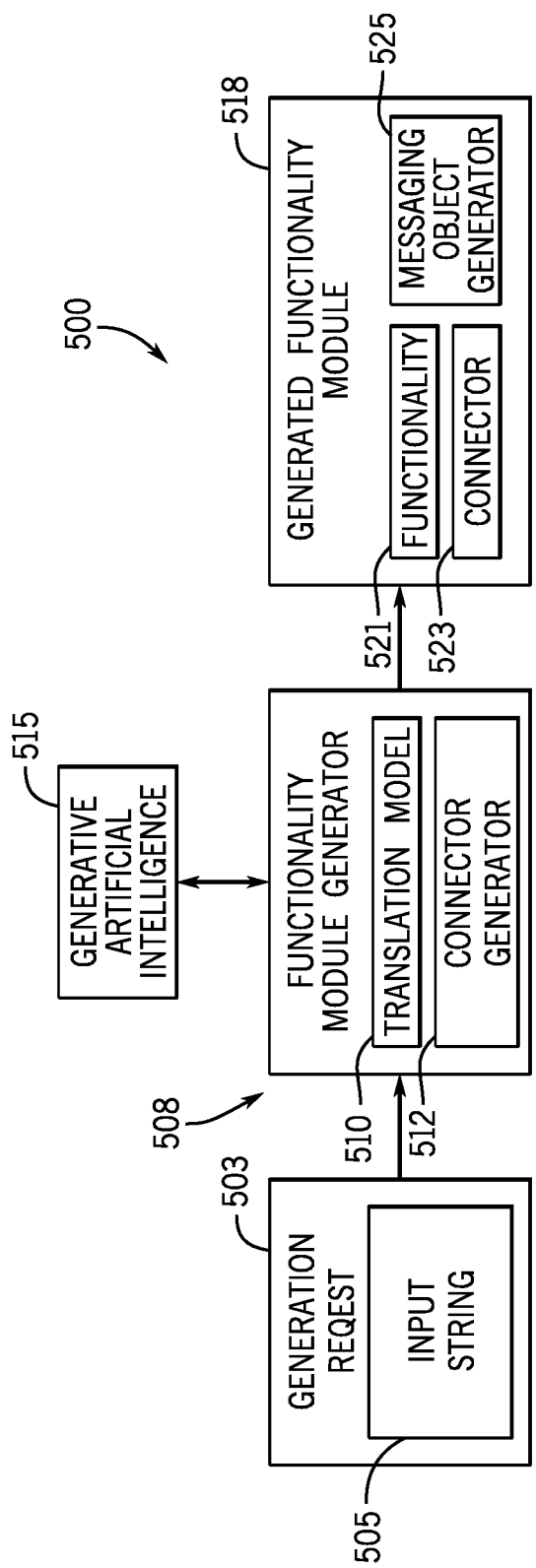
FIG. 7A illustrates a block diagram illustrating an example system for generating functionality modules for inclusion in a workflow.

Turning to FIG. 7A, an example system 500 for generating a functionality module is shown. The system 500 may be implemented by one or more servers or devices. The system 500 may include a functionality module generator 508. The functionality module generator 508 may receive a generation request 503, such as over network 110, defined by a user or system to generate or develop a generated functionality module 518. The functionality module generator 508 may be in communication with a generative artificial intelligence (AI) 515 to assist in generating the generated functionality module 518.

The generation request 503 may be or represent an input received into the system 500 requesting the generation of a functionality module having a functionality 521. The generation request 503 may include various information or requests in addition to a functionality 521, such as a preferred machine language or aesthetically identifying features in a user interface. In some examples, the generation request 503 may specify intended connections to existing functionality modules, such as an input or an output. The generation request 503 may be input by a user, such as at an interface on a user computing device 104 or a builder computing device 108. In some examples, the generation request 503 may be an output from a separate system, device, or existing functionality module. The generation request 503 may be received at the functionality module generator 508 in the form of an input string 505. The input string 505 may contain or include natural human language or human understandable language. In some examples, the generation request 503 may be or include machine language readable by the functionality module generator 508.

In a specific example, the generation request 503 may be received as an input string 505 from a user device 104 or builder computing device 108 stating, "Generate a functionality module for receiving text from an existing functionality module as msg.payload and converting it to an MD5 string and returns as msg.payload."

The functionality module generator 508 may generate functionality modules in response to receiving a generation request 503. The functionality module generator 508 may include a translation model 510 for analyzing or interpreting the generation request 503 or input string 505. For example, the translation model 510 may provide or perform natural language processing ("NLP") to analyze human language data in the generation request 503. The translation model 510 may include or be in communication with various interpreters, such as a python interpreter, for analyzing generation requests 503 in the form of a machine language. The translation model 510 may identify various relevant portions of the generation requests 503, or input string 505, and translate or convert the information into structured or semi-structured data for communication with the generative AI 515. For example, the translation model 510 may convert the input string 505, or generation request 503, into structured data with a high degree of organization or with a defined schema, such as a relational database. In other examples, the generation request 503 or input string 505 may be converted by the translation model 510 into semi-structured data that may not have a pre-defined data model, or schema, or is not organized in a pre-defined manner, yet has some level or organization of the information such as in a hierarchy, categories, or groups of data.

By converting the input string 505 or generation request 503 into a structured or semi-structured form, requests to the generative AI 515 may be more clearly defined and result in improved outputs from the generative AI 515. For example, input strings 505 in the form of natural human language may be data rich (e.g. define or include relatively large amounts of information relative to the size of the data defining the request) and include important information in the form of grammatical structure or word choice. The conversion of the input string 505 to a structured or semi-structured form by the translation model 510 may assist in differentiating or clarifying the generation request 503 to the generative AI 515. In general, when an input to a generative AI 515 is more clearly defined, the output may be closer to the request 503. The translation model 510 may add various predetermined or preconditioned information to the structured or semi-structured form of the generation request 505 to further improve the output from the generative AI 515. For example, various constraints may assist in the generative AI 515 in understanding the input or intended output.

Returning the specific example discussed above, the translation model 510 may analyze the input string 505 to determine the relevant portions. For example, the translation model 510 may identify that the intended output is a generated functionality module 518 and that the functionality module 518 should include a functionality 521 that receives inputs as a message, the message having a payload, and the payload including text. The translation model 510 may further identify that the text included in the payload should be encrypted in the form of an MD5 string. The functionality module 518 should then be configured to output a message, the message having a payload, and the payload including text in the form of an MD5 string. By utilizing NLP, the translation model 510 may understand and/or parse the intended inputs and outputs defined in the generation request 503 without the explicit use of identifiers such as "input" or "output." The translation model 510 may then convert the input string 505 into the structured or semi-structured data of the generation request 505 to more clearly define the inputs and outputs to the generative AI 515.

By allowing a user to input the generation request 505 in the form of natural human language, a user may save time or effort in defining a new functionality module to the system 500. Further, a user with less skill (e.g. lacking understanding of the terminology or organization of a functionality module) may define a generation request 505 more effectively than program an entirely new functionality module 518.

The generative AI 515 may be in communication with the functionality module generator 508, including one or more components of the functionality module generator 508 such as the translation model 510. The generative AI 515 may include systems using neural networks that analyze or process data to identify the patterns and structures within the existing data to generate new or original content. The generative AI 515 may generate functionality modules or portions of functionality modules. For example, the generative AI 515 may generate portions of the functionality module as an output, such as machine language defining the functionality 521, while the functionality module generator 508 generates the remainder of the functionality module incorporating the output of the generative AI 515. To assist the functionality module generator 508 in completing a functionality module, the generative AI 515 may generate or define module requests. The module requests may provide instructions, such as executable machine language, defining the portions of the functionality module for the functionality module generator 508 to create.

The generative AI 515 may be trained on functionality modules or workflows containing functionality modules to develop an understanding of functionality modules. For example, existing functionality modules may be provided to the generative AI for the purpose of generating new configurations of functionality modules. The generative AI 515 may be specifically designed to generate functionality modules or may be usable for a variety of additional or separate tasks from the generation of functionality modules. Further, while reference is made to a single generative AI 515, it is appreciated that multiple generative AI systems or models may be used for different functions or in conjunction with each other to assist in generating a functionality module 518. The generative AI 515 may be on or executed by a separate server or computational device.

The functionality module generator 508 may include a connector generator 512 for defining connectors 523 of a generated functionality module 518. The connector generator 512 may define the portions or executable features of the functionality modules allowing the functionality module to receive messaging objects or inputs and outputs. The connector generator 512 or the functionality module generator 508 may also generate portions of the functionality module not generated by the generative AI 515. For example, if the generative AI 515 only generates the functionality 521 of the generated functionality module 518, the connector generator 512 may generate portions of generated functionality module 518 that enable the drag and drop connections in a user interface.

The generated functionality module 518 may be output from the functionality module generator 508. The generated functionality module 518 may include a functionality 521 corresponding to the generation request 503. The functionality 521 may be similar as described above, utilizing or receiving inputs to perform a task or accomplish some result, such as running a programmed functionality, algorithm, or code with the inputs. The generated functionality module 518 may include a messaging object generator 525. The messaging object generator 525 may define the outputs of the generated functionality module 518. The messaging object generator 525 may convert or translate the outputs of the functionality 521 to be passed to or received by a second functionality module as a messaging object, as described above.

One or more connectors 523 may receive or transmit messaging objects between the functionality modules. The connectors 523 may be executable packages or features allowing functionality modules to be linked, such as in a user interface. The generated functionality module 518 may include one or more connectors 523. In other examples, the connectors 523 may be separate from the functionality modules. In linking the functionality modules, the connector 523 may receive or interpret messaging objects and various machine languages utilized by the functionality modules and communicate the information to the messaging object generator 525 for defining the output or messaging object.

Returning to the specific example, the generated functionality module 518 may include a functionality 521 for converting text to an MD5 string. The generated functionality module 518 may include or be in operative association with connectors 523 to a second functionality module providing a msg.payload including text as a messaging object or output. After performing the functionality, the generated functionality module 518 may generate an output or messaging object in the form of an msg.paylod including an MD5 string. The output may then be communicated to a third messaging object or as an output from the system.

Figure 7B:
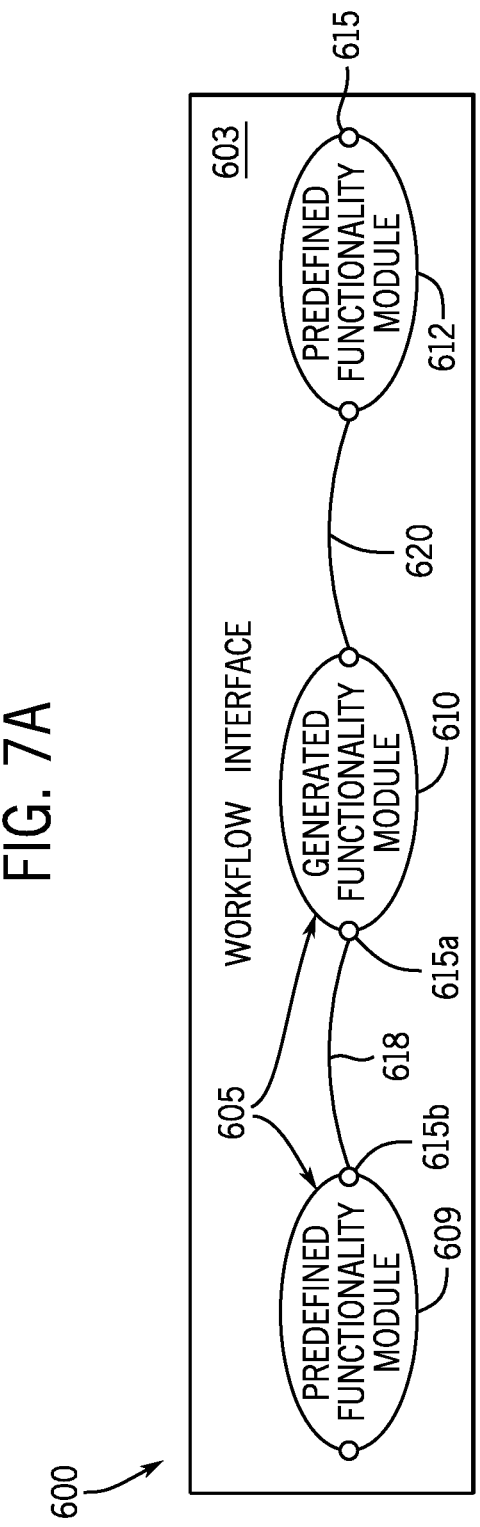
FIG. 7B illustrates an example interface illustrating functionality modules in an example workflow.

Turning to FIG. 7B, a graphical example of a workflow 600 is shown in an example workflow interface 603. A workflow 600, as described above, may include two or more functionality modules, represented in the user interface 603 by nodes 605, connected to perform a function. An executable application may be defined by a workflow, such as workflow 600. The workflow interface 603 may be a diagram or graphical interface representing the connections between the functionality modules by messaging objects represented as lines connected to nodes 605. The workflow interface 603 may be viewable on a display 114, such as on a user device 104 or a builder computing device 108. The workflow interface 603 may enable drag and drop, clickable selections, or various other methods of connecting the functionality modules represented by nodes 605.

The workflow 600 may include existing or predefined functionality modules or generated functionality modules 518 generated by the functionality module generator 508. For example, the workflow 600 may include a first predefined functionality module represented by node 609, a generated functionality module 518 represented by node 610, and a second predefined functionality module represented by node 612. The workflow interface 603 may graphically represent the nodes 605 as a variety of shapes (e.g. circles, ovals, squares, triangles, etc.) or icons (e.g. 2D or 3D icons). The connectors 523 may be represented by a second icon or shape at the nodes 605 for receiving or outputting messaging objects, which may be represented graphically by lines 618, 620 connecting the nodes 605. For example, the connection between the first predefined functionality module node 609 and the generated functionality module node 610 may be graphically represented by the generated functionality module node 610 connected by a line defining the first messaging object 618 extending from the output connector 615b of the first predefined functionality module 609 to an input connector 615a at the generated functionality module node 610. A second line representing the second messaging object 620 may extend from the generated functionality module node 610 to the second predefined functionality module node 612.

Returning to the specific example, the first predefined functionality module (node 609) may receive an input from a user in the form of text and generate an msg.payload including the text. The first predefined functionality module (node 609) may transmit the msg.payload in a messaging object (line 618) to the generated functionality module 518 (node 610). The generated functionality module 518 (node 610) may then perform functionality 521 to generate a second messaging object (line 620) by the messaging object generator 525 to include the msg.payload with an MD5 string. The second messaging object (line 620) may then be received at the second predefined functionality module (node 612).

Figure 8:
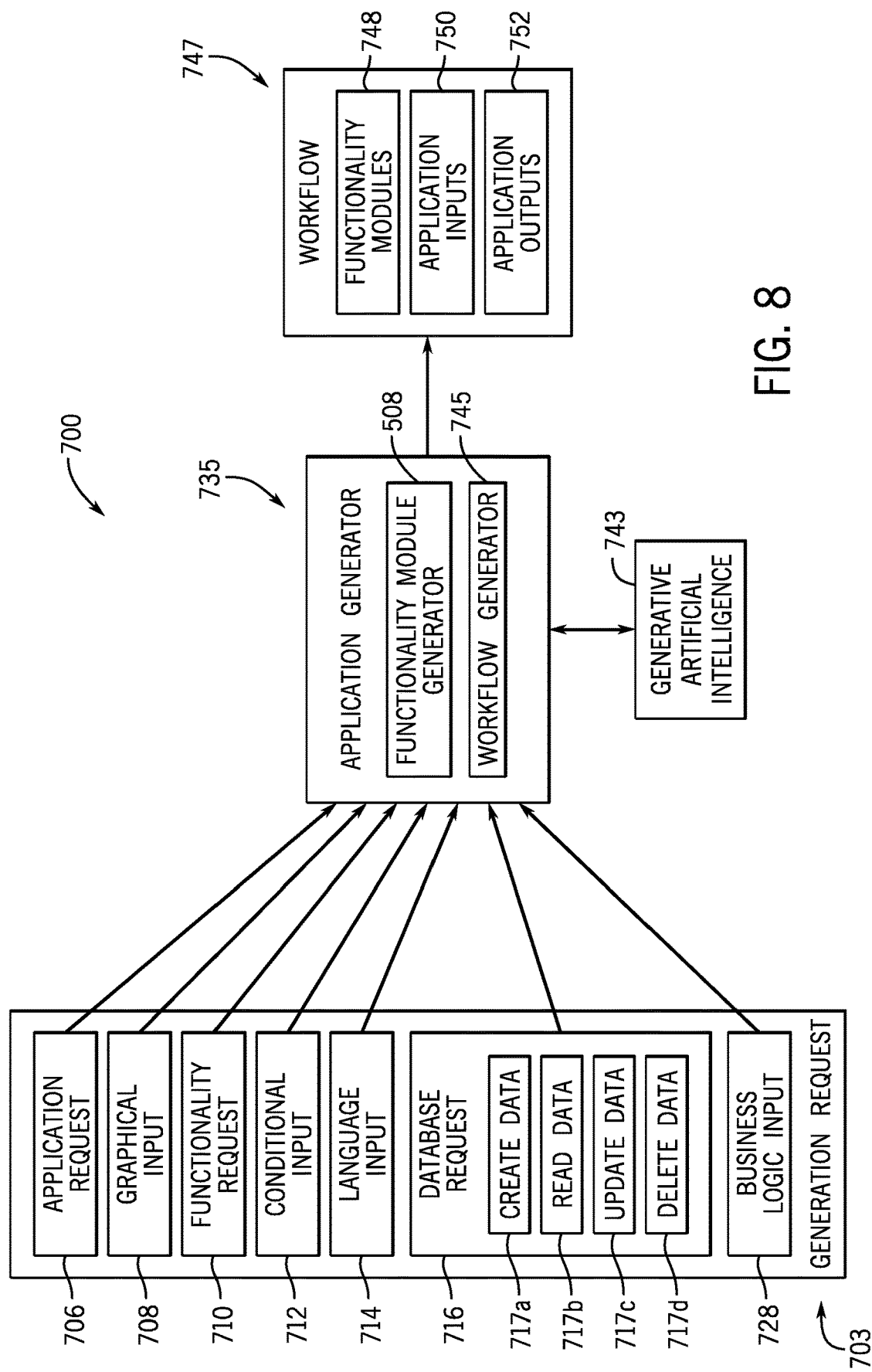
FIG. 8 illustrates a block diagram illustrating an example system for generating an application using functionality modules.

Turning to FIG. 8, an example system 700 for generating a workflow 747 by utilizing or communicating with a generative AI 743 is shown. The system 700 may include an application generator 735 in communication with the generative AI 743 to generate functionality modules 748 and/or arrange functionality modules 748 into a workflow 747 defining an executable application. The application generator 735 may receive a generation request 703 from a user specifying one or more requested features of the workflow 747, such as by an input at a user device 104 or a builder computing device 108. The workflow 747 may be a portion of a larger application system or end-to-end programming solution.

The generation request 703 may include one or more inputs by a user. The generation request 703 may include various intended functions, conditions, requirements, or constraints to be included in the workflow 747. The generation request 703 may include various categories of information. For example, the generation request 703 may be in the form of text such as a string, an image, or various other manners of conveying information. While specific reference is made to the types of categories of information in the generation request 703, it is appreciated that various inputs by the user may include multiple categories or portions of categories. The application generator 735 may not require a generation request 703 with each of the various categories of requests or inputs to generate a workflow 747. The various categories of information may be explicitly contained in the generation request 703 or inferentially included in the generation request 703. The generation request 703 may be similar to the generation request 503 and may include similar or the same information.

In a specific example of a generation request 703 to illustrate the system 700, a user may input to the system 700 a request 703 to "Generate a green webpage providing both mobile and PC browser accessibility depending on the type of user device used. The webpage will display images of widgets. The widget images will receive comments and likes. Generate the webpage in compliance with state and federal regulations." The request 703 may include an image or other graphical examples of widgets or similar webpages for analysis.

The generation request 703 may include an application request 706. The application request 706 may be a portion of the generation request 703 defining a high level overview or category of the application or portion of the application, such as a type of application (e.g. user interface, webpage, financial processing, and so on). For example, in the specific example noted above, the request to generate a webpage may define the application request 703 as the high level concept of the application.

The generation request 703 may include a graphical input 708. The graphic input 708 may be portions of the generation request 703 relating to aesthetic or visual features (e.g. color, background, logo, user interfaces, and so on) of the workflow 747 or portions of the generation request 703 in the form of images (e.g. photos or diagrams). For example, the graphical input 708 may specify a color or spacing of objects displayed as outputs 752 of the workflow 747. In other examples, the graphical input 708 may be an image or diagram of an intended arrangement of a workflow 747 or an output 752 of the workflow 747. In the specific example, the request for a green webpage or the included images in the generation request 703 may each define a graphical input 708 or a portion of the graphical input 708.

The generation request 703 may include a functionality request 710. The functionality request 703 may be a portion of the generation request 703 defining the intended outputs 752 of the workflow based on intended inputs 750. For example, with reference to the specific example, the likes, comments, and images of widgets may each represent intended inputs to the workflow 747 and each define a functionality request 710 or a portion of the functionality request 710. Similarly, the functionality request 710 may include the display of the likes, comments, and images as outputs from the workflow 747.

The generation request 703 may include conditional inputs 712. Conditional inputs 712 may specify various conditions or circumstances affecting the generation of an output 752 by the workflow 747. The conditional input 712 may define various scenarios the application may encounter and be expected to adapt the outputs 752 in response. For example, the conditional inputs 712 may specify conditions qualifying various outputs 752 based on the inputs received 750 to the workflow 747. With reference to the specific example, the request to create both a mobile browser and a PC browser depending on the type of user device used defines a conditional input. In such an example, whether to produce an output 752, mobile browser or a PC browser is based on an input 750, the type of user device used.

The generation request 703 may include a language input 714. The language input 714 may include either or both the human natural language or information relating to machine language of the workflow 747. For example, the use of English in a generation request 703 may itself be a portion of a language input 714 and indicate a request for the workflow 747 to generate outputs 725 or receive inputs 750 in English. In the specific example, the description of a mobile browser or PC browser may indicate a request generate a workflow 747 capable of producing outputs 752 readable by browsers utilizing both JavaScript or HTML.

The generation request 703 may include a database request 716. The database request 716 may specify or indicate various categories of information to be placed in a database, such as in the memory components 116. The database request may include a request to create data 717*a*, read data 717*b*, update data 717*c*, or delete data 717*d*. In the specific example, the request to use likes and comments or to display images of widgets may define information to be stored and, accordingly, the database request 716 or a portion of the database request 716.

The generation request 703 may include a business logic input 728. The business logic input 728 may be a portion of the generation request 703 defining or requesting the implementation of real-world business rules to the workflow 747. The business rules may operations, definitions and constraints that apply to the workflow 747. For example, the business logic input 728 may include or define best practices, regulations, policies, laws, or other rules that are relevant to the workflow 747. For example, in the specific example, the request to follow state and federal regulations may be a business logic input 728 and may act as a constraint over other requests or operations of the workflow 747.

Turning to the application generator 735, the application generator 735 may include one or both of a functionality module generator 508 and a workflow generator 745. The functionality module generator 508 included in the application generator 735 may the same or similar to the functionality module generator 508 previously described. The workflow generator 745 may organize two or more functionality modules 748 into an arrangement to achieve the workflow 747 requested by the generation request 703. The application generator 735 and workflow generator 745 may include similar features or components as the functionality module generator 508, such as translation models. Accordingly, the application generator 735 or workflow generator 745 may similarly analyze and interpret the generation request 703, such as interpreting the natural language model to generate one or more input strings in a structured or semi-structured data for communication with the generative AI 743. By utilizing translation models or by structuring the data, the quality of inputs to the generative AI 743 may be improved.

Further, by allowing natural language as an input or generation request 703, the time required to develop deployable solutions may be decreased.

The application generator 735, or the functionality module generator 508 and a workflow generator 745 may be in communication with each other and with the generative artificial intelligence 743. The generative AI 743 may be the same or similar to the generative AI 515 discussed with reference to system 500. The generative AI 743 may similarly include one or more generative AI models or systems used in conjunction with the application generator 735 to assist in generating the workflow 747.

In response to a generation request 703, the application generator 735 and the generative AI 743 may determine a grouping or arrangement of functionality modules 748 required to create a workflow satisfying the generational request. The application generator 735 may provide the generative AI 743 with existing or predefined functionality modules or similar workflows to assist the generative AI 743. The generative AI 743 or the application generator 735 may whether newly generated functionality modules are necessary or an arrangement of the modules into a workflow 747.

The generative AI 743 and the application generator 735 may arrange the workflow 747 to receive application inputs 750 and application outputs 752. The application inputs 750, as reference above, may be inputs expected to be received at the generated workflow 747 such as by a user at a user device 104 in communication with the workflow 747. The application outputs 752, as reference above, may be the outputs from the workflow 747 that are received at the user device 104. In the specific example, the resulting workflow 747 may be arranged to receive an application input 750 from the browser on a user device 104 identifying the device 104 as a mobile device or a PC and requesting to access the webpage. Responsive to the application input 750, the workflow 747 may generate the widget displaying webpage in a corresponding mobile or PC webpage format as an application output 752.

Figure 9:
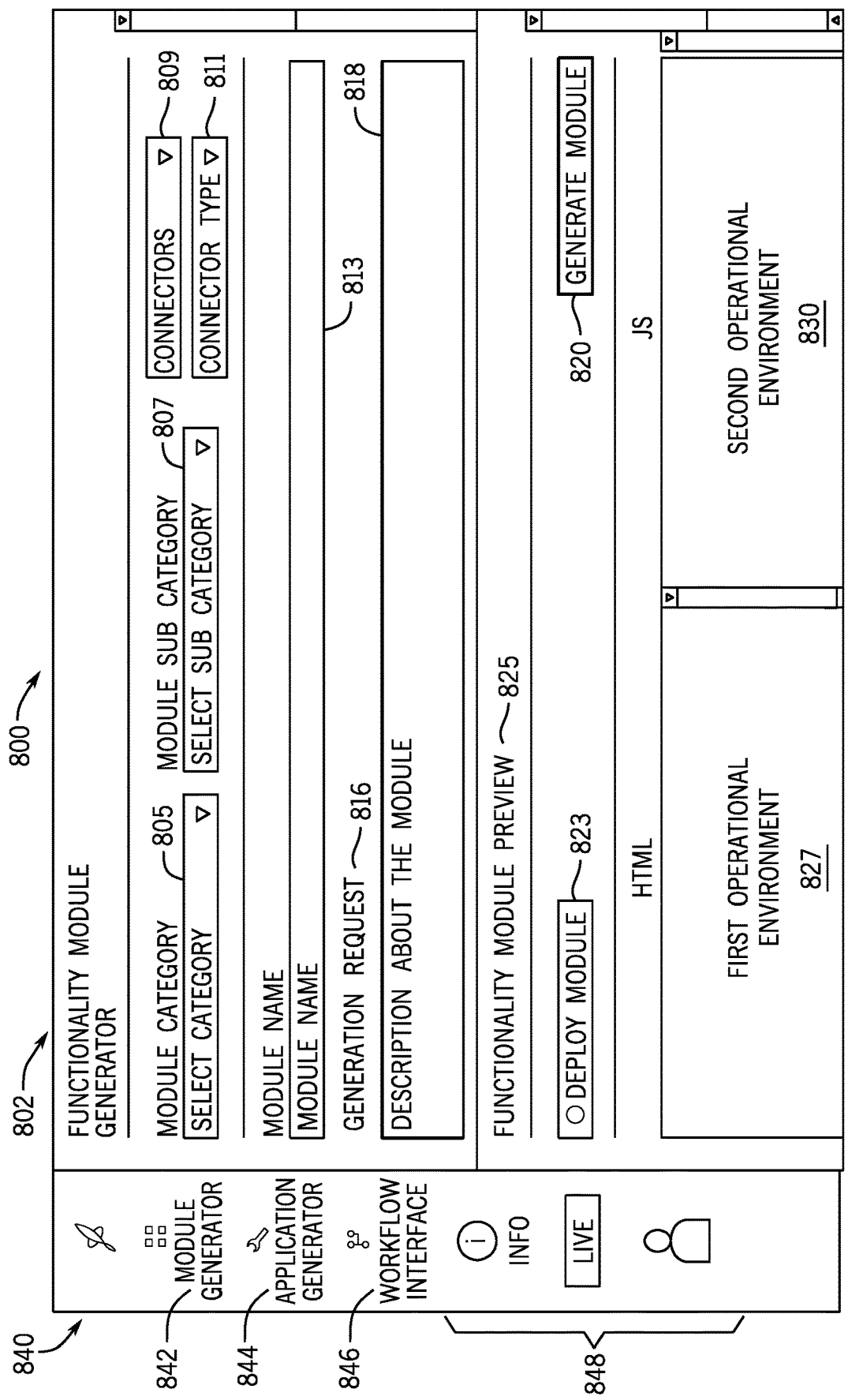
FIG. 9 illustrates an illustration of an example user interface for generating an application of functionality modules.

With reference to FIG. 9, an example user interface 800 displayable on a user device is shown. The user interface 800 may allow for or assist in managing and utilizing the various systems disclosed herein. The user interface 800 may receive one or more features of a generation request 503 for a functionality module 518 or a generation request 703 for a workflow 600 or 747. The user interface 800 may assist a user in structuring or defining the generation requests 503, 703 to further increase efficiency in generating programmable solutions.

In one example of the interface 800, the user interface 800 includes a functionality module generator interface 802. The functionality module generator interface 802 may include filters or categories to further specify generation request 503 or to further assist in improving the structuring of the generation request 503 to the generative AI. For example, the functionality module generator interface 802 may include one or more drop down menus or filters. The filters may include types of module categories 805 such as functionality modules for receiving an input from a user, information collection, encryption, and so on. The generator interface 802 may include sub filters or sub category filters 807 corresponding to the selected filter or category 805, such as for defining a type of user input (e.g. text, image, touch, etc.) corresponding to the selection of a user input in the first category 805. The functionality module generator interface 802 may include filters for selecting a number of connectors 809 for the functionality module or types of connectors 811 (e.g. input or outputs).

The functionality module generator interface 802 may include features to receive textual inputs from a user. The functionality module generator interface 802 may allow a user to name the functionality module, which may be graphically represented in the workflow interface 603 to assist in organizing functionality modules. The functionality module generator interface 802 may also allow for a user to define the natural language generation request 816, which may be similar or the same as generation request 503 or generation request 703, in a generation request window 818. The textual inputs to the interface 802 may be processed or analyzed upon request by a user, or automatically to facilitate quicker deployment of solutions.

The functionality module generator interface 802 may also allow for the preview 825 or generation of the functionality module. For example, a user may request to generate a module by selecting an icon 820. The preview 825 of the functionality module may display the functionality module generated in a first machine language or operational environment 827 or in a second machine language or second operational environment 830. The machine language of the generated functionality module may be reviewable or editable in the preview windows 827, 830. By allowing preview before deployment, personnel may review the code for errors, bugs, copyright notices, or other issues before deploying the functionality module. The user may then decide to deploy the module to a workflow by selecting a deploy icon 823.

The user interface 800 may also include a navigation menu 840 to select various other user interfaces. For example, the functionality module generator interface 802 may be selected by icon 842. A user interface configured to assist in generation an application may be selected by application generator icon 844. A workflow interface providing a drag and drop interface and other tools may be selectable by icon 846. The user interface 800 may include various other icons or menus 848 for various other tasks or editing, reviewing, or publishing various functionality modules or workflows.

Figure 10:
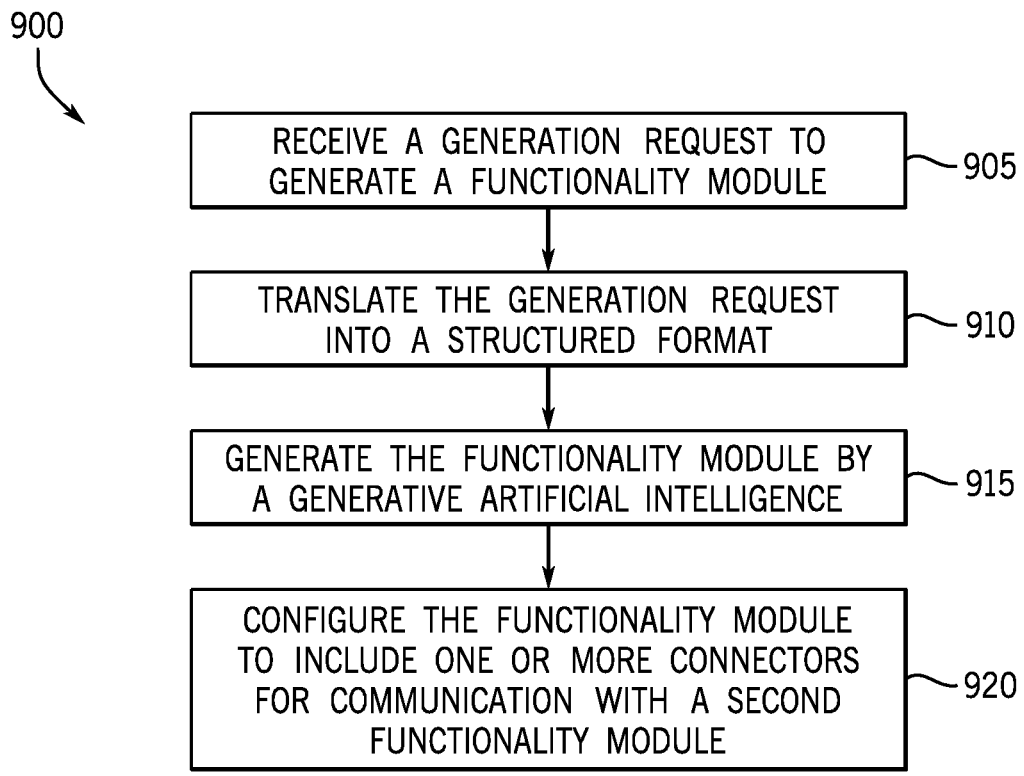
FIG. 10 illustrates a flow chart illustrating an example method for generating a functionality module with generative artificial intelligence.

Turning to FIG. 10, an example method 900 for generating a functionality module with the assistance of generative artificial intelligence is illustrated. The method 900 may be executed by a processing unit on a server, such as the configuration server 102, or by processing units on various other computing devices. The operations of method 900 may be performed in orders other than those presented without deviating from the present disclosure.

The method 900 may begin with operation 905. A generation request 503 may be received at the functionality module generator 508, such as by a user device 104 over a network 110. The generation request 503 may define a request in the form of an input string to generate a functionality module 518.

The method may proceed to operation 910, where the functionality module generator 508 may translate the generation request 503 into a structured or a semi-structured format or data. The translation may be performed by a translation model executed by a server, such as the builder computing device 108, or by a computing device, such as the builder computing device 108. The translation of the generation request 503 as part of operation 910 may include analyzing natural language and converting or interpreting the generation request 503 to define various relevant information contained in the generation request 503.

The method 900 may proceed to operation 915, where the generative artificial intelligence 515 may generate a functionality module 518. The generative AI 515 may generate the functionality module 518 in whole or in part. For example, the generative AI 515 may define a portion of the functionality module 518, such as the machine language defining the functionality 521.

The method 900 may proceed to operation 920, where the generated functionality module 518 may be configured to include one or more connectors 523 for communication with a second functionality module. The generated functionality module 518 may be configured to include connectors 523 by either the generative AI 515 or the functionality module generator 508. The connectors 523 may define how many messaging objects are sent or received, such as inputs or outputs, between functionality modules. The connectors 523 may also enable drag and droppable connections between the functionality modules.

Figure 11:
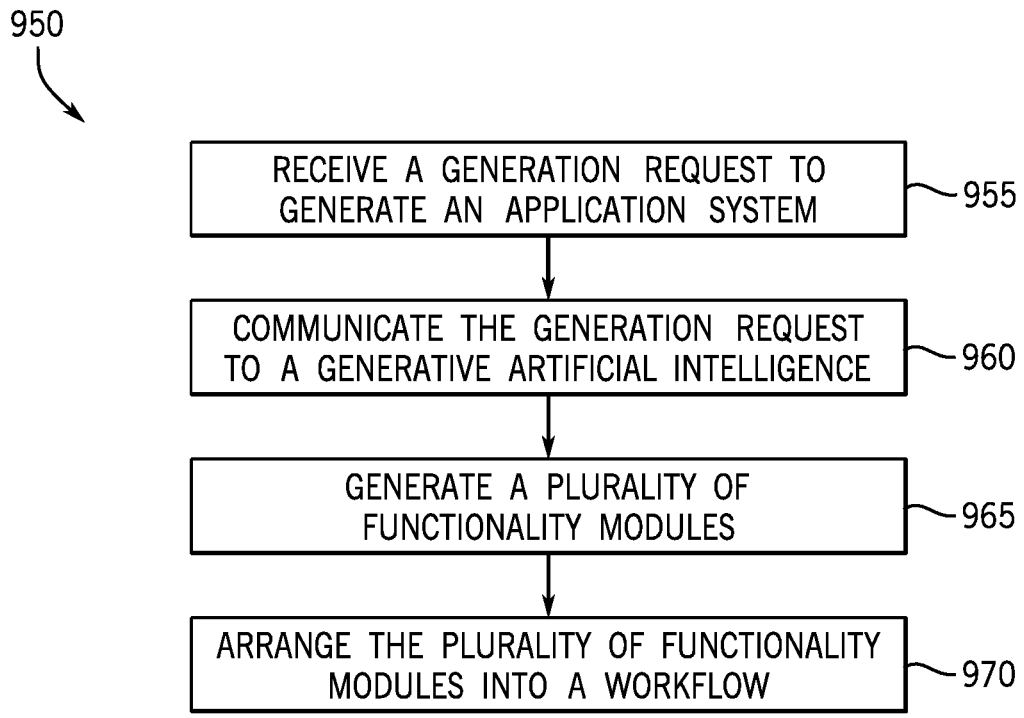
FIG. 11 illustrates a flow chart illustrating an example method for generating an application with generative artificial intelligence.

Turning to FIG. 11, an example method 950 for generating an application or workflow 747 including functionality modules 748 with the assistance of generative artificial intelligence is illustrated. The method 950 may be executed by a processing unit on a server, such as the configuration server 102, or by processing units on various other computing devices. The operations of method 950 may be performed in orders than those presented without deviating from the present disclosure.

The method 950 may begin with operation 955, where a generation request 703 may be received at an application generator 735 to generate a workflow 747. The generation request 703 may be communicated to the application generator 735 such as by a user device 104 over a network 110. The generation request 703 may be in the form of machine language or natural human language.

The method 950 may proceed to operation 960 where the generation request 703 may be communicated to a generative artificial intelligence 743. The generation request 703 may be translated or interpreted by the application generator 735 prior to communicating the request 703 to the generative AI 743. For example, the application generator 735 may translate or interpret the generation request using translation models to determine relevant information in the generation request 703. The application generator 735 may convert the generation request into a structured or semi-structured data or another format to assist the generative AI 743 in understanding or interpreting the generation request 703.

The method 950 may proceed to operation 965, where a plurality of functionality modules 748 are generated. The application generator 735 may include a functionality module generator 508 in communication with the generative AI 743. The functionality module generator 508 and the generative AI 743 may each or either generate one or more of the functionality modules 748. For example, the generative AI 743 may create generated functionality modules 518 for a workflow 600, while the generative AI 743 may communicate with the functionality module generator 508 to generate one or more preexisting modules 748.

The method 950 may proceed to operation 970, where the plurality of functionality modules 748 may be arranged into a workflow 747. The application generator 735 may include a workflow generator 740 in communication with the generative AI 743. The generative AI 743 or the workflow generator 740 may each generate all or a portion of the workflow 747. For example, the generative AI 743 may determine an order of functionality modules 748 for the workflow 747, while the workflow generator 740 arranges the functionality modules 748 into the workflow 747. After arranging the functionality modules 748 into a workflow 747, the application may be an executable workflow 747 generating one or more outputs 752 responsive to one or more inputs 750. The workflow 747 may be executable by a server, such as the configuration 102 or deployment server 106, or a device, such as the user computing device 104.

Figure 12:
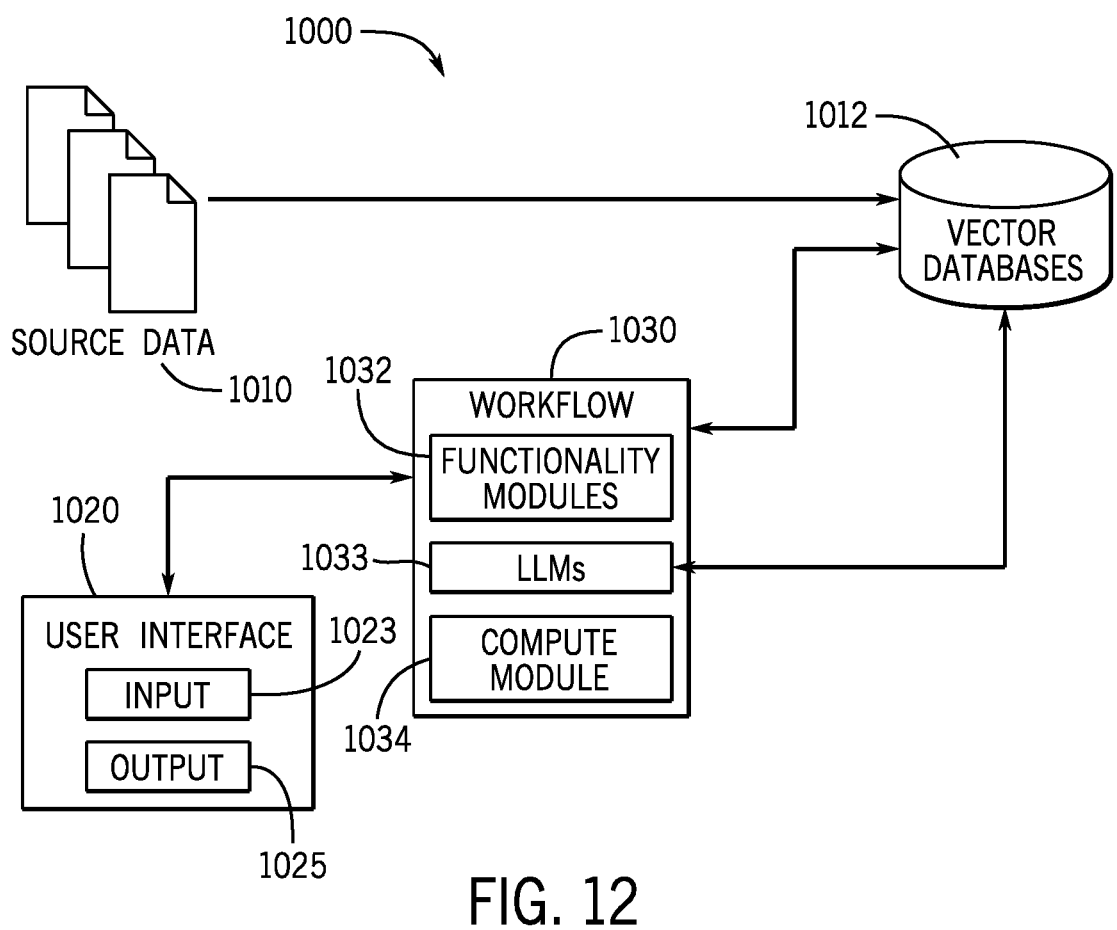
FIG. 12 illustrates a block diagram of an example system for executing a workflow.
Figure 13:
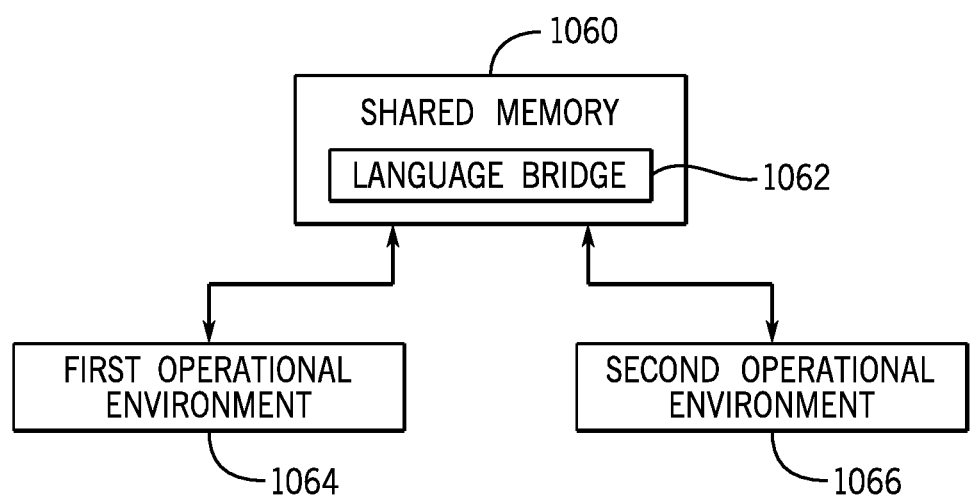
FIG. 13 illustrates a block diagram of an example shared memory of the system.
Figure 14:
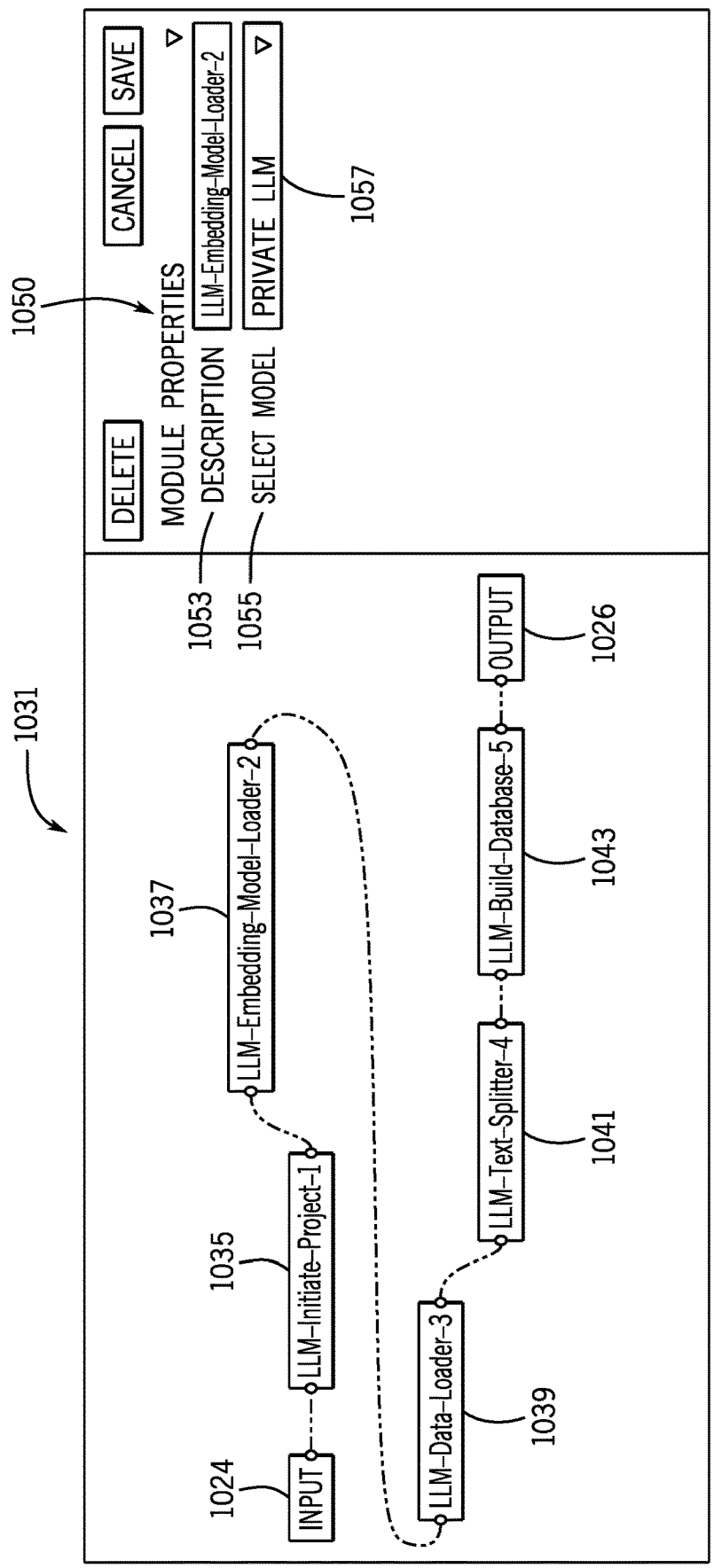
FIG. 14 illustrates an example user interface for building a workflow.

Turning to FIGS. 12-14, an example system 1000 allowing a user to create a workflow 1030 utilizing artificial intelligence is disclosed. The system 1000 may be a programmable system to quickly develop a drag and droppable programmable solution utilizing artificial intelligence. The artificial intelligence systems may be large language models (LLMs) designed to interpret data in the form of natural language prompts and produce an output. The system 1000 may be arranged to efficiently use memory to provide quickly deployable solutions operable on a variety of devices. The system 1000 may include or be executed by the systems or devices described above.

FIG. 12 depicts an example block diagram of the system 1000 including a workflow 1030 to receive inputs 1023 and generate outputs 1025 responsive to the inputs 1023.

The system 1000 may include a user interface 1020. The user interface 1020 may be displayable at a computing device 113, such as user device 104. The user interface 1020 may receive inputs 1023 from a user requesting an operation by the workflow 1030. For example, a user may provide an input 1023 including a query in the form of a text string at the user interface 1020. After operation of the workflow 1030, the user interface 1020 may provide an output 1025 at the user device 104. The output 1025 may be in a variety of forms, such as text or numerical data, corresponding to a request included in the input 1023. In other examples, the input 1023 or output 1025 may be numerical data, an image, audio media, or any other types or combinations of information.

The system 1000 may include source data 1010. The source data 1010 may include information related to the tasks, operations, or solutions of the workflow 1030. The information in the source data 1010 may be in a variety of formats. For example, the source data 1010 may include numerical data or natural language (e.g. human readable language). In some examples, the source data 1010 may be written documents communicated between people such as policies, records, or other forms of information. In some examples, a user may supplement or upload new information to the source data 1010 to further train or inform the system 1000.

The system 1000 may include vector databases 1012 corresponding to the source data 1010. The vector databases 1012 may include the information of the source data 1010 in a structured or semi-structured form, such as a vector. For example, the content of the source data 1010 may be stored as mathematical representations of the information of the source data 1010. The vectors may vary in size depending on the type of information in the contained in the source data 1010. The source data 1010 may be automatically converted into the information stored in the vector database 1012 by the system 1000.

The system 1000 may include the workflow 1030. The workflow 1030 may include a plurality of functionality modules 1032 or LLMs 1033 arranged to define one or more operations. The workflow 1030 may include one or more compute modules 1034 defining one or more computing elements for implementing one or more of the functionality modules 1032 or LLMs 1033. The workflow 1030 may be a programmable solution providing outputs 1025 responsive to inputs 1023.

The functionality modules 1032 may be similar to the functionality modules as described herein. The functionality modules 1032 may define self-contained executable components that may receive inputs, execute a desired functionality, and output data related to the processed inputs. The functionality modules 1032 may be represented by nodes in a workflow interface 1031, as may be similarly described above. The functionality modules 1032 may be programmed to operate in a variety of different operational environments and in a variety of programming languages such as python, JavaScript, or others depending on the desired functionality. The functionality modules 1032 may be representative of, generate calls to, or include large language models 1033.

The LLMs (large language models) 1033 may be a form of artificial intelligence trained to classify, contextualize, or generate natural language, such as written text. The LLMs 1033 in the present system 1000 may interpret or contextual the source data 1010 or the information stored in the vector databases 1012. The LLMs 1033 may be utilized similarly to, or be a type of, the functionality modules 1032 in the workflow 1030. For example, the LLMs 1033 may be placed in the workflow 1030 to execute a desired functionality. In some examples, the LLMs 1033 may be included in a functionality module 1032 or in communication with a functionality module 1032 representing the LLM 1033. In some examples, an LLM 1033 of the system 1000 may be utilized to filter relevant information from the source data 1010 in response to an input 1023. In other examples, an LLM 1033 may contextualize an input 1023 to improve a query of the vector database 1012 or the source data 1010. It should be noted that although various examples are discussed with respect to LLMs 1033, various embodiments may be utilized with other types of AI models, not just limited to LLMs. As such, the discussion of any particular implementation is meant as exemplary only.

In developing or implementing an LLM 1033, various methods may be used to train the LLM 1033 to understand and produce relevant content in response to an input. To train an LLM 1033, the LLM 1033 may be provided with some existing information to predict or generate comparable information. In one example, an LLM 1033 may be trained by providing the LLM 1033 directly with the source data 1010 and using models to refine outputs from the LLM 1033. However, such methods are often time consuming and require a large amount of memory to train the LLM 1033. Another method to train an LLM 1033 is by providing the LLM 1033 with data in a numerical or vector format. The memory and time requirements to convert natural language information into a vector may be comparatively less than directly training the LLM 1033. Accordingly, the LLM 1033 of the present system 1000 may be trained more quickly by providing already converted information from the vector database 1012 to the LLM 1033. Further, because utilizing a vector database 1012 requires less memory, multiple LLMs 1033 may be used in a single workflow at a greater speed or with lower memory requirements.

The computing modules 1034 may be representative of computing hardware or devices such as CPUs, GPUs, memory or data storage devices, displays, servers, or other elements executing the workflow 1030 or portions of the workflow 1030. For example, the compute modules 1034 may include or represent one or more of the computing devices 113. The hardware represented by the compute modules 1034 by be at one or more physical locations. For example, the hardware may be distributed across one or more local and/or remote devices. The compute modules 1034 may be represented by or similar to functionality modules 1032 in the workflow interface 1031, such as one or more nodes. In some examples, the workflow 1030, or functionality modules 1032 or LLMs 1033 in the workflow 1030, may automatically select, require, or default to one or more compute modules 1034. For example, a given LLM 1033 may be located at a specific memory component 116 and require a compute module 1034 representing the memory component 116 in the workflow 1030. In some examples, the functionality modules 1032 or LLMs 1033 may be selectively deployed to the various computing devices represented by the compute modules 1034 after placement of the compute modules 1034 in the workflow 1030. By providing selectable deployment of compute modules 1034, costs for hardware to implement solutions may be reduced or customized to efficiently meet the demands of a workflow 1030, or the functionality modules 1032 and/or LLMs 1033 of the workflow 1030. In some examples, the selection of compute modules 1034 may provide for the selectable transfer between hardware systems or to quickly update hardware systems for a workflow 1030.

At operation, the system 1000 may provide the user interface 1020 to the user device. The user interface 1020 may be a separately defined workflow or may be generated by a functionality module 1032 of the workflow 1030. An input 1023 may be received at the user interface 1020 corresponding to information contained within the source data 1010. The information of the source data 1010 may be contained in the vector database 1012 as described above. The workflow 1030 may include an LLM 1033 configured to interpret the input 1023. In some examples, a functionality module 1032 or a second LLM 1033 may refine the input 1023 and communicate the refined input to the LLM 1033. The LLM 1033 may query or analyze the vector database 1012 to produce a response to the input 1023. The LLM 1033 may contextualize the information of the vector database 1012 (e.g. provide the information in a natural language form). The response from the LLM 1033 may be provided as the output 1025 or provided to another LLM or functionality module 1032 to further refine the response.

In some examples, the system 1000 may include prompts to assist in defining inputs or outputs to the LLM 1033. The prompts may be predefined limitations or queries to the LLM 1033 to improve the accuracy of the response of the LLM 1033. For example, a system prompt may define boundaries or limitations of the LLM 1033, such as a topic or type of answer. The prompts may be predefined by the workflow 1030 or by a user. In other examples, a prompt may be generated by a first LLM 1033 in response to an input and provided to a second LLM 1033.

With reference to FIG. 13, in some examples, the system 1000 may include two or more operational environments (e.g. programming languages). Each of the operational environments may be selected to provide an increased performance by reducing memory use, time to execute the system, or other efficiencies for the tasks of the system. For example, the system 1000 may use JavaScript to develop or deploy the workflow 1030, providing a first operational environment 1064, and the LLM 1033 may utilize python, defining a second operational environment 1066. To allow the workflow 1030 to utilize an LLM 1033, the system 1000 may include a language bridge 1062 to translate or interpret between the first 1064 and second operational environments 1066.

LLMs 1033 often generate or read and write large amounts of data. If the workflow 1030 includes multiple LLMs 1033, a unique interpreter or translator between programming languages for each LLM 1033 could generate more data than the system 1000 can handle or execute efficiently. For example, in addition to the memory required to generate multiple interpreters, the multiple interpreters may process similar or overlapping functions creating redundant processes. To solve this, the system 1000 may include a shared memory 1060 accessible by the workflow 1030, the functionality modules 1032, or the LLMs 1033. Accordingly, when an LLM 1033 or functionality module 1032 using a second operation environment 1066 is placed in the workflow 1030, a language bridge 1062 may be generated and stored on the shared memory 1060. The language bridge 1062 may be accessed by each functionality module 1032 or LLM 1033. Further, when any additional LLM 1033 or functionality module 1032 is placed in the workflow 1030, the system 1000 may automatically check the shared memory 1060 for an existing language bridge 1062. By placing the language bridge 1062 on the shared memory 1060, the system 1000 may utilize a plurality of LLMs 1033 and generate increasingly complex workflows 1030.

In some examples, the shared memory 1060 may also generate virtual computing environments. The virtual computing environments may be used when libraries for functionality modules 1032 or LLMs 1033 are in conflict. The shared memory 1060 may place the conflicting libraries in the separate virtual computing environments corresponding the modules 1032 or LLMs 1033 to prevent system crashes while limiting the total amount of data utilized by the system 1000.

FIG. 14 illustrates an example of a completed workflow 1030, programmed by coupling functionality modules 1032, represented by nodes, within a workflow interface 1031. The functionality modules 1032 may be connected with messaging objects, as described herein. The completed workflow interface 1031 may demonstrate or display a workflow 1030 to be built or executed via the system 1000, or deployed as a multiplatform based programming application or process. The workflow interface 1031 depicted in FIG. 14 may, in some examples, be the workflow interface 800 of FIG. 9.

The workflow interface 1031 may display a plurality of nodes. The nodes may generally be graphical representations of the functionality modules 1032, LLMs 1033, or compute modules 1034. For example, node 1024 may represent a functionality module 1032, LLM 1033, and/or a compute module 1034 to receive the input 1023 from the user interface 1020. The workflow interface 1031 may allow for drag and drop placement of the nodes. For example, a user may select a desired node from a list and drop the node onto the workflow interface 1031. The system 1000 may automatically connect the node to an existing node in the workflow 1030. When the node is placed in the workflow interface 1031 the system 1000 may automatically download, install, or otherwise write the functionality module 1032 corresponding to the node into the workflow 1030. In some examples, if a compute module 1034 is associated with or required by a functionality module 1032 or an LLM 1033, a node representing a compute module 1034 may be automatically placed in the workflow interface 1031.

The workflow interface 1031 may also allow a user to edit customizable module properties 1050 of a functionality module 1032, a LLM 1033, or compute modules 1034 represented by a node or functionality module 1032. For example, as depicted in FIG. 14, a node may be deleted or saved. With reference to the LLM 1033, the properties 1050 may define features common or related across multiple types of LLMs 1033. For example, unique properties 1050 of a number of unique LLMs 1033 may be abstracted to common or similar properties 1050 of multiple LLMs 1033. By abstracting the features to similar properties 1050 a variety of LLMs 1033 may be easily deployed or customized in the workflow 1030.

The properties 1050 may include a description 1053 of the node. For example, the selected node 1037 may represent an LLM 1033 configured to generate embeddings and a corresponding description 1053 may be defined at the user interface. In some examples, the workflow interface 1031 may provide options to select or customize characteristics of the LLM 1033. For example, the user may select the locations or types 1055 of LLM models 1033 used by the system 1000. For example, a user may select an LLM 1033 hosted on a private server (e.g. a private LLM), a remotely located server, a shared server, or an open source LLM. By providing options to select the types of LLMs, the user may structure a workflow 1030 that maintains the privacy or confidentiality requirements. For example, private information, such as health information, may be prohibited from being provided to an LLM 1033 on a shared or public server.

In some examples. the module properties 1050 may similarly allow customization of properties of a compute module 1034. For example, a network address or other identifier of the hardware represented by a compute module 1034 may be input or selected. The module properties 1050 may also define the selectable types of hardware, such as from a drop down list, or performance characteristics of hardware represented by the compute module 1034.

With continued reference to FIG. 14, the nodes arranged in the workflow interface 1031 may provide an example workflow 1030. The workflow 1030 may relate to a chatbot designed to answer questions regarding a patient's medical plan. While reference may be given to the node, it is appreciated the executed item may be a functionality module 1032 or LLM 1033 represented by the node.

The workflow 1030 may be executed by a processing unit on a server, such as the configuration server 102, or by processing units on various other computing devices. The operations of workflow 1030 or system 1000 may be performed in orders other than those presented without deviating from the present disclosure.

The workflow 1030 may begin with an input 1023 received at a functionality module 1032 represented by node 1024. For example, the functionality module 1032 may provide or generate the user interface 1020 displayable on a user device. The input 1023 may be in the form of a natural language string. In a specific example, the input 1023 may be "My medical insurance is ABC plan. What is my co-pay for an out-of-network physician?"

The workflow 1030 may continue to node 1035 representing an LLM 1033. The node 1035 may correspond to an LLM designed to initiate a project. For example, node 1035 may request the language bridge 1062 be loaded to the shared memory 1060. The LLM represented by node 1035 may interpret the natural language input 1023. For example, the node 1035 may convert the natural language into a vector or other structured format. The LLM 1033 may also analyze or summarize the query to define further inputs or prompts to additional LLMs in the workflow 1030. The node 1035 may also automatically load vector databases 1012 corresponding to the determined queries. For example, with reference to the specific example, the node 1035 may analyze the input to determine the user has plan ABC and any information not related to ABC should be disregarded. The node 1035 may determine the relevant topic is a co-pay value or percentage and seek to provide a numerical value or calculation to determine a co-pay. The system 1000 or LLM may automatically load or access vector databases 1012 related to information on the ABC health plan or co-pay calculations after analyzing the input 1023.

The workflow 1030 may continue to node 1037 representing an LLM 1033, which may generate embedding for contextualizing information in the vector databases 1012. For example, the LLM 1033 may encode the input 1023 into a vector for comparison with the vector database 1012. The LLM 1037 may then match the input vector to information stored in the vector database 1012. For example, the LLM 1033 may analyze the vector databases 1012 to determine information corresponding to ABC plans and co-pays and convert that information into natural language text. When the workflow 1030 executes node 1037, the system 1000 may check the shared memory 1060 for an existing language bridge 1062 and either utilize the existing language bridge 1062 or load a language bridge 1062. Accordingly, the total memory used may be reduced. As discussed above, the node 1037 may be initiated on a private server or be a privately generated LLM. Without providing the private option, the system 1000 may not otherwise utilize an LLM 1033 for interpreting the plan information, such as when the plan information includes confidential or sensitive information corresponding to a particular patient.

The workflow 1030 may continue to node 1039 representing an LLM 1033, which may structure the text output from the node 1037. For example, the text output from the node 1037 may be unstructured or organized in a manner not readily understandable by the user.

The workflow 1030 may continue to node 1041 including representing an LLM 1033 arranged to filter the structured text to a meaningful output. For example, the information that corresponds to ABC plans and co-pays may include text irrelevant to the prompt, such as appeal processes or legal documents unrelated to the initial input 1023. Accordingly, the LLM 1033 of node 1041 may remove redundant or unnecessary information to generate a concise and cohesive response. For example, the output of node 1039 may be reduced from legal information to "A 50% co-pay is required for out-of-network physicians."

The workflow 1030 may continue to node 1043 representing an LLM that stores the answer to the prompt in a database to improve or more efficiently generate response to future prompts. Afterwards, the workflow 1030 may continue to node 1026 representing a functionality module 1032 representing or including the output 1025 to the user. For example, the functionality module 1032 may generate a user interface displaying the answer in the form of a chat menu.

FIGS. 15-23 depict additional examples of functionality modules 1032 that may be deployed in workflows 1030. In the figures, the functionality modules 1032 are depicted as nodes of a user interface 1020. The functionality modules 1032 depicted in FIGS. 15-23 may be designed to represent, generate communications with, or otherwise be deployed with one or more LLMs 1033. The functionality modules 1032 may have one or more adjustable or customizable properties or options to change a property of an LLM 1033, or an interaction with an LLM 1033 by the system 1000 or a functionality module 1032. In some examples, corresponding functionality modules 1032 may provide similar customization of properties of compute modules 1034, or the hardware represented by the compute modules 1034. For example, an interface may include various characteristics or types of hardware that may be represented by compute modules 1034 or execute LLMs 1033 or functionality modules 1034.

The customizable properties or filters may be displayable at an interface, such as the user interface 1020. The customizable properties may be abstracted such that features common to one or more unique LLMs 1033 are associated with or displayed as features common across multiple LLMs 1033. The abstraction of the customizable properties may reduce cost, time, or training required to generate workflows 1030 or other solutions. In some examples, similar functionality modules 1032 or interfaces may provide customization of properties of compute modules 1034, or hardware represented by compute modules 1034. By providing an interface that enables customization of properties of the system 1000, functionality modules 1032, LLMs 1033, or compute modules 1034, solutions or workflows 1030 may be built and deployed quickly and efficiently. The functionality modules 1032 discussed in FIG. 15-23 may similarly access or utilize the language bridge 1062 discussed herein.

Figure 15:
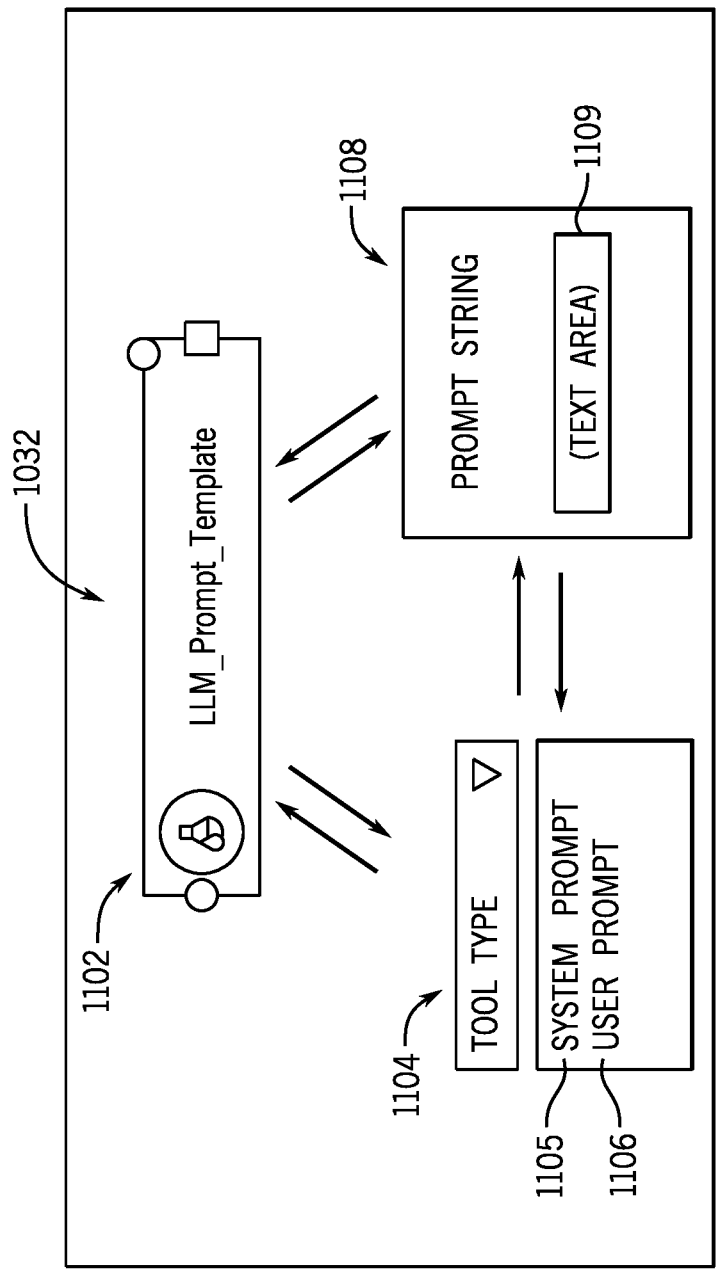
FIG. 15 illustrates an example block diagram and user interface of a large language model prompt template functionality module.

FIG. 15 depicts an example LLM prompt template functionality module 1102. The prompt template functionality module 1102 may define the purpose or constraints of an LLM 1033 or a workflow 1030 for a given interaction with a user. For example, the prompt template 1102 may ensure an output 1026 is related and relevant to a given input 1023. The prompt template functionality module 1102 may be an LLM 1033 or an executable generating a call or instructions to an LLM 1033. The LLM prompt template 1102 may include interfaces to adjust or define one or more customizable properties or filters. For example, the prompt template functionality module 1102 may include a prompt type interface 1104 to define a type of prompt, such as they system prompts 1105 or a user prompt 1106, or receive a prompt string from a prompt string interface 1108 defining a prompt.

The prompt types may be predefined and selectable from a prompt type interface 1104. The prompt type interface 1104 may include system prompts 1105. A system prompt 1105 may define the purpose or bounds of the system 1000. For example, the system prompts 1105 may be define the personality or tone, scope or domain, or relevant information for an interaction with a user. Accordingly, a prompt template functionality module 1102 including a system prompts 1105 may be placed into a workflow 1030 where a user input is received, or an input generally 1024, to assist in defining the purpose of the input 1024. In a specific example, the system prompt 1105 may provide instructions to an LLM 1033 for a restaurant ordering system to limit response to information related to food listed on the restaurant's menu, rather than any type of food generally. Accordingly, a prompt template functionality module 1102 including a system prompts 1105 may be associated where a user may place a food order or request information about the menu.

The prompt type interface 1104 may include user prompts 1106. User prompts 1106 may define constraints or rules to an LLM 1033 specific to a unique interaction. For example, the user prompt 1106 may be a user's input 1023 to a LLM 1033. The user prompt 1106 may be related to the system prompt 1105. For example, the user prompt 1106 may be a request within the bounds set by the system prompt 1105. With reference to the specific example of the system prompt 1105 described above, a user prompt 1106 may request information about a single menu item, such as a cheeseburger. Accordingly, the prompt template module 1102 may generate a prompt that limits responses to those related to a cheeseburger.

The system prompts 1105 or user prompts 1106 may be received as or defined by natural language text. For example, the prompt template module 1102 may present a prompt string interface 1108 including a text area 1109 to receive the natural language text. The natural language text may define the system prompt 1105 or user prompt 1106 by the intended purpose or outcome of the prompt. For example, a natural text system prompt 1105 may be "limit responses to information contained in the menu." An example natural text user prompt 1106 may be "what types of burgers are on the menu." By receiving information defining the system prompts 1105 or user prompts 1106 as natural text, a developer may quickly deploy a prompt template module 1102 for a variety of situations. Further, the prompt template module 1102 may require fewer system prompts 1105 or user prompts 1106 to ensure an output 1026 is related and relevant to a given input 1023.

The prompt template module 1102 may include or receive multiple system prompts 1105 or user prompts 1106. In some examples, the prompt template 1102 includes both system prompts 1105 and user prompts 1106. Similarly, a natural language prompt may include or define multiple system prompts 1105 or user prompts 1106.

Figure 16:
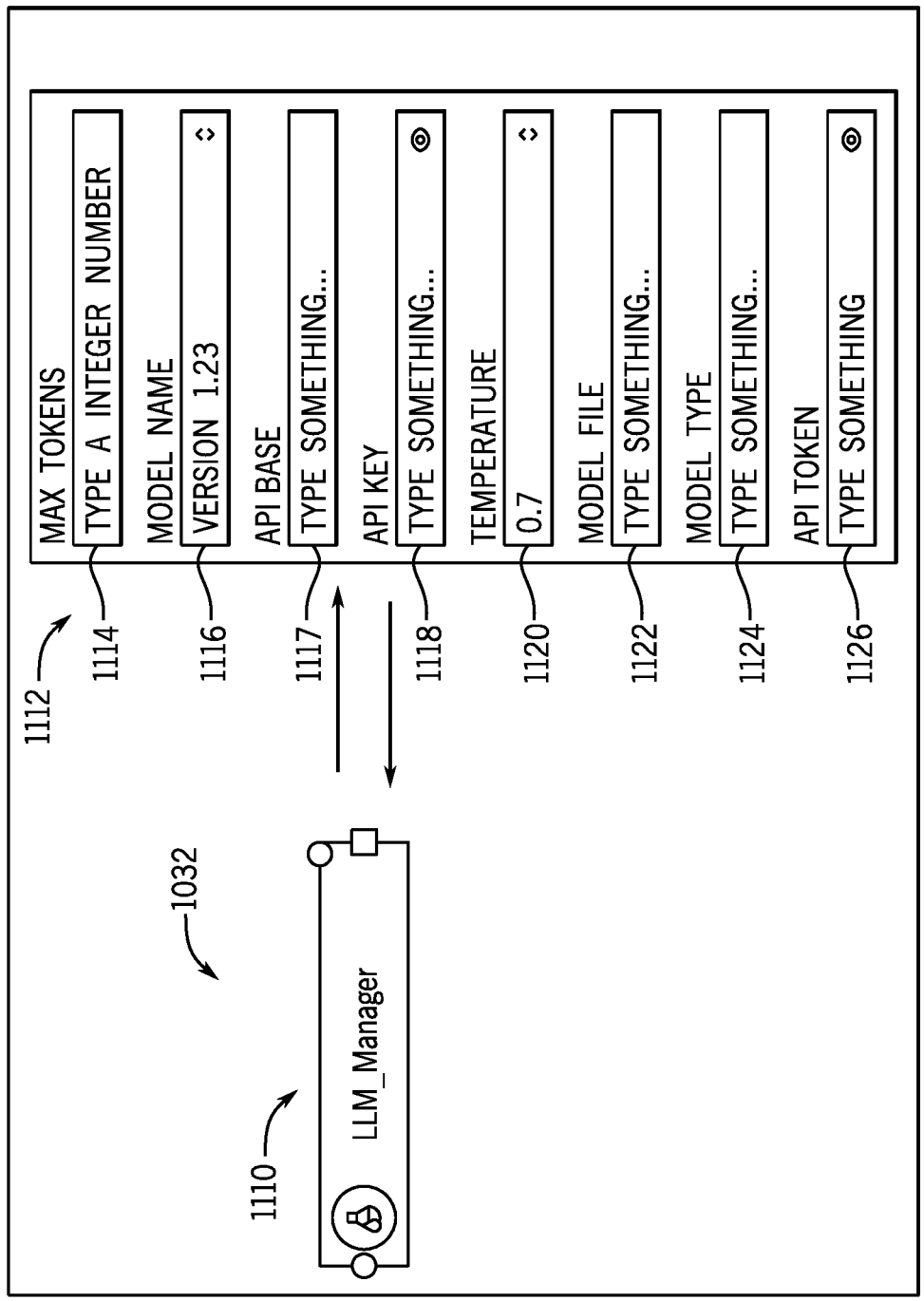
FIG. 16 illustrates an example block diagram and user interface of a large language model manager functionality module.

FIG. 16 depicts an example LLM manager functionality module 1110. The LLM manager 1110 may provide a properties interface 1112 to select customizable properties or define the one or more LLM's 1033 used by the system 1000. The LLM manager 1110 may also identify, define the access information, or open a selected LLM 1033 for use in the workflow 1030. The LLM manager 1110 may also identify credentials to identify or access an LLM 1033, whether remote or local. By customizing the properties of the LLM 1033 in a defined properties interface 1112 a developer may easily and quickly customize features of an LLM 1033 for deployment in a workflow 1030.

The properties interface 1112 may relate to a performance or function of an LLM 1033. For example, the properties interface 1112 may include or provide customization of an amount of tokens, such as a maximum, to be used by the LLM 1033. The tokens may be the basic units processed by the LLM 1033. Accordingly, by providing the number of tokens to be used by the LLM 1033, the developer may customize the accuracy of the LLM 1033 or the data or cost to operate the LLM 1033. The properties interface 1112 may include a model selection 1116 enabling the deployment of different versions of an LLM 1033. For example, a version of an LLM 1033 suited better for a certain task or trained on relevant source data 1010 may be selected. The properties interface 1112 may include customization of the temperature 1120 of the LLM 1033. The temperature 1120 may be a numerical representation of the degree to which the LLM 1033 generates new content or limits responses to factual or existing information.

The properties interface 1112 may provide customization of the LLM 1033 used or define information relevant to accessing the LLM 1033. For example, the properties interface 1112 may include identification of an LLM 1033 on a device, whether remote or local, by the model type 1122. In some examples, a remote LLM 1033 may be identified by an API base 1117. In some examples, the LLM 1033 may be stored on a local device and may be identified by a model file location or file path 1122. Similarly, the properties interface 1112 may include identification or selection of API keys 1118 to identify a system 1000, workflow 1030, or functionality module 1032 accessing the LLM 1033. In some examples, the API key 1118 may identify a user executing the workflow 1030 or functionality modules 1032, or a developer defining the components of the workflow 1030. Similarly, the properties interface 1112 may include identification of API token 1126, which may identify or include the key 1118 or alternatively, or additionally, include identifying information about the type of information communicated to the LLM 1033. In some examples, the API token 1126 may identify or include authorizations or passkeys to access the LLM 1033.

In some examples, a functionality module 1032 may be a compute module 1034 manager. In such an examples, the property interface 1112 may provide customization of one or more features a compute module 1034, or the physical devices or components represented by the compute module 1034. For example, a type of device (e.g. memory device, CPU, GPU, or the like) may be selected from a drop down list, or a version of the device. In some examples, a location, such as remote or local to a device arranging the workflow 1030, or an IP address associated with a device including the components may be selectable. Additional properties, such as a performance, number of components or devices used, security protocols, or the like for a compute module 1034 may be selectively changed.

Figure 17:
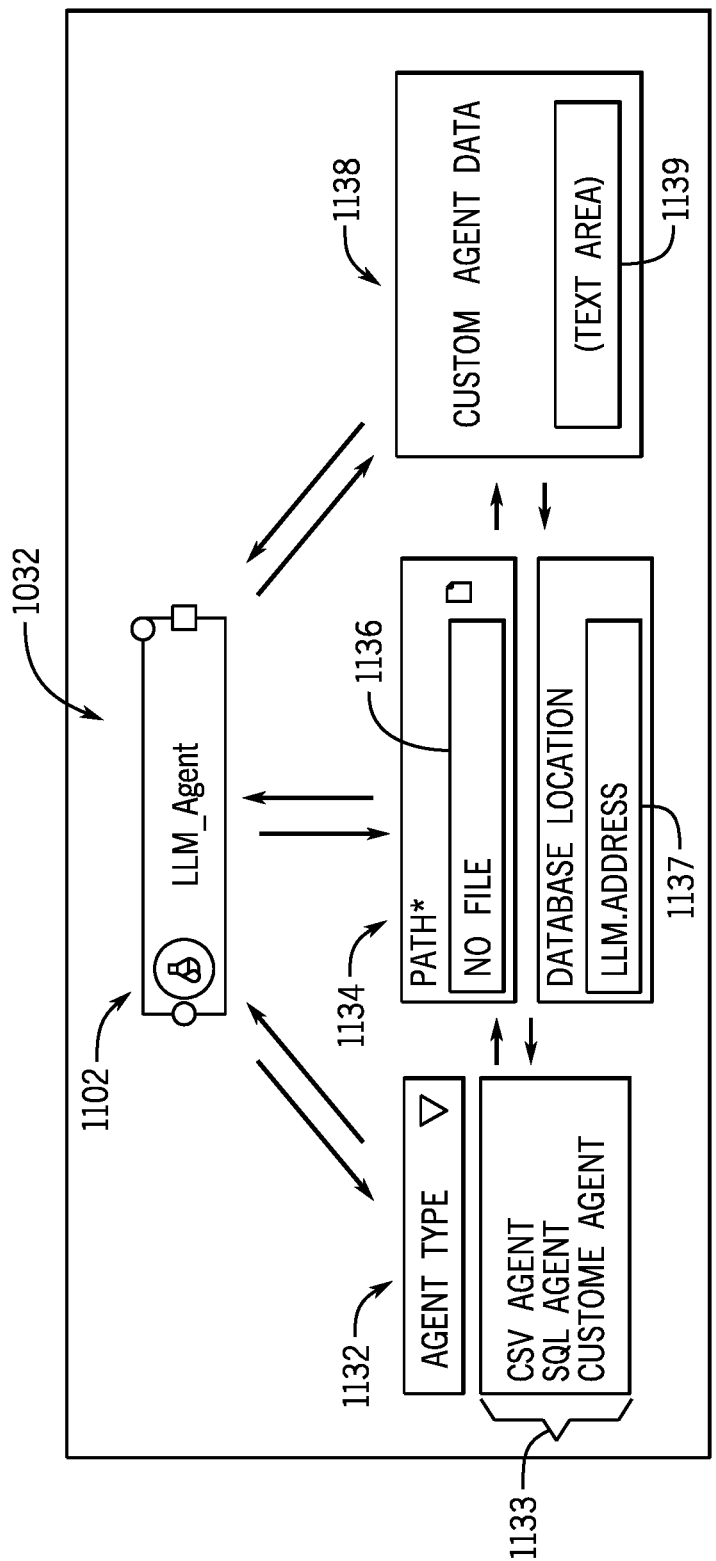
FIG. 17 illustrates an example block diagram and user interface of a large language model agent functionality module.

FIG. 17 depicts an example LLM agent functionality module 1130. The LLM agent 1130 may be or represent an LLM 1033 designed to identify the tasks or operations necessary for one or more LLMs 1033 to produce an output 1025. The tasks or operations may be identified responsive to an input 1023, such as a user prompt 1106. For example, a single input 1023 may require two or more operations to be executed to generate an output 1025. In some examples, the tasks or operations may be requested by another functionality module 1032 or LLM 1033. The LLM agent 1130 may be an LLM 1033 or generate a call to an LLM to interpret the input 1023. In one example, a user prompt 1106 may state "write a chatbot." The LLM agent 1130 may be trained to recognize a chat bot requires the generation of a front end or web interface to receive messages, transmitting the receive message to a system capable of interpreting the messages, and populating the user interface with a response to the message. By breaking down the tasks, the LLM agent 1130 may enable developers to define complex inputs 1023 to the system. The LLM agent 1130 may be deployed in the workflow 1030 as a functionality module 1032, or the LLM agent 1130 may be wrapped into the system 1000. In other words, the LLM agent 1130 may be configured to identify tasks within a particular request, rather than how to solve the particular request.

The LLM agent 1130 may include one or more customizable properties. For example, the LLM agent 1130 may include an agent interface 1132 to specify one or more types of agents 1133. The agent types 1133 may be arranged to analyze and identify tasks in certain inputs 1023, such as natural language or data sets. For example, the agent type 1133 may be selected for their ability to interpret inputs 1023 including or defined by CSV files, SQL files, or may be customizable for interpreting additional sources of information. A single agent type 1133 or multiple agent types 1133 may be included in a single LLM agent 1130.

The LLM agent module 1130 may include an interface 1134 including customizable properties to identify or select an LLM 1033 to be used as an LLM agent. For example, a locally stored LLM may be identified by a file path or URI 1136. The LLM 1033 may also be identified at a remote location, such as a server, by URL or address 1137. In some examples, a custom agent interface 1138 may be included a text area 1139 to receive natural language text or information defining intended properties of the LLM agent. For example, a natural text input may detail common tasks break down, such as in response to certain prompts or operations.

Figure 18:
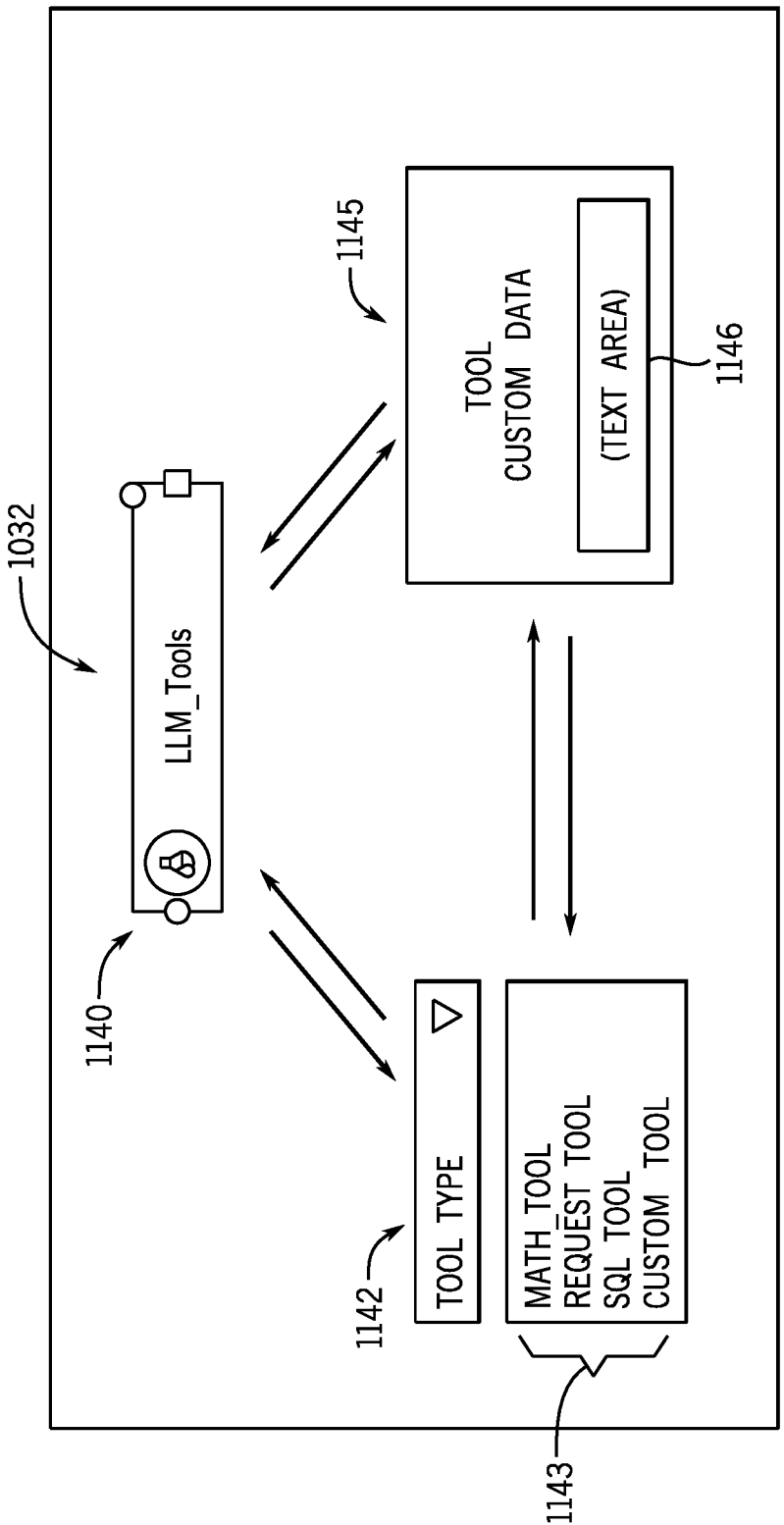
FIG. 18 illustrates an example block diagram and user interface of a large language model tuning or tool functionality module.

FIG. 18 depicts an example fine tuning or LLM tool module 1140. The tool module 1140 may be a functionality module 1040 to provide training information to an LLM 1033. Existing or published LLMs 1033 may lack current or updated information related to a task or operation. The tool module 1140 may be an LLM 1033, or call to an LLM 1033, that retrains an existing LLM 1033 with new knowledge. For example, the tool module 1140 may retrain weights of an LLM 1033 with new knowledge. The LLM tool module 1140 may update the existing codebase of the LLM 1033.

In some examples, the LLM tool module 1140 may include a tool type interface 1142 including a listing of selectable preset fine tuning tools or data sets 1143 to train an existing LLM 1033. As discussed herein, training an LLM 1033 on only relevant or necessary data may reduce memory costs, such as by only updating an LLM 1033 with the specific selected tools 1143. For example, a workflow 1030 may relate to interpreting or executing certain mathematical operations and a Math_Tool may be selected to train the LLM 1033 to perform the operations.

In some examples, a custom tool interface 1145 may be included to receive natural language text describing information or data to be used in fine tuning an LLM 1033. For example, text may be input at the text area 1146 to specify a type of data to train the LLM 1033. In one example, a developer may define a request for the LLM 1033 to be trained on new data captured between a first date and a second date, or the developer may upload the training data, such as source data 1010, at the custom tool interface 1145. By allowing for fine tuning of existing LLMs 1033, the LLM tool module 1140 may update an application or LLM 1033 without generating a new LLM 1033, and memory usage may be conserved.

Figure 19:
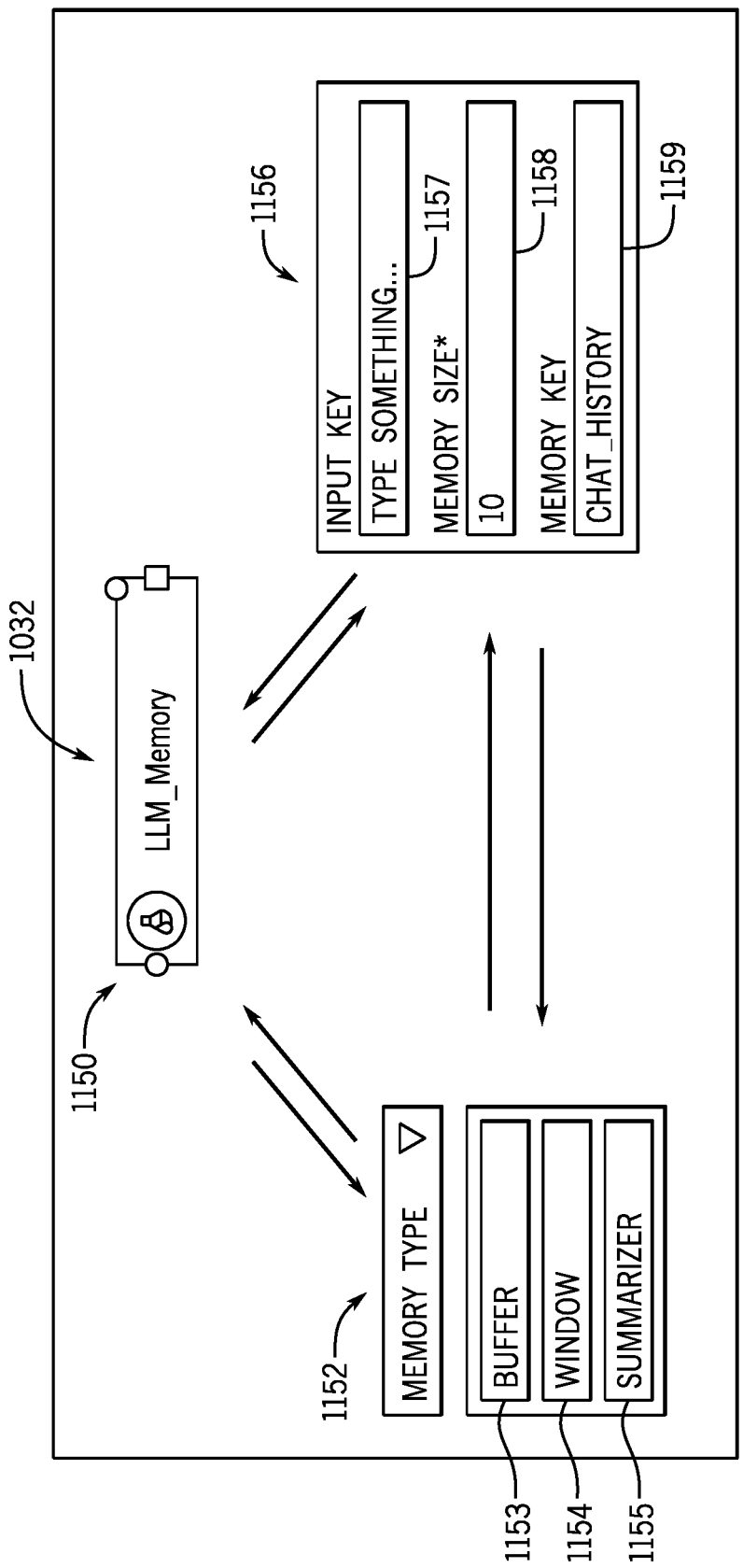
FIG. 19 illustrates an example block diagram and user interface of a large language model memory functionality module.

FIG. 19 depicts an example LLM memory module 1150. The LLM memory module 1150 may be used to limit the data stored or analyzed by an LLM 1033 during an operation. The LLM memory module 1150 may include an interface 1152 to define a type of memory. For example, the memory types may include a buffer 1153, a window 1154, a summarizer 1155, or more. A buffer 1153 may store inputs 1023, such as messages, and extract the information contained in the input 1023 as a variable. The variable may be stored in the form of a string. A window 1154 may be a sliding memory, only storing data over a specified interval of interactions, time, or another measurable unit. A summarizer 1155 may summarize data beyond a certain number of interactions to maintain information on a specified range of interactions, while reducing the amount of memory necessary to track the entire interaction. The LLM memory module 1150 may include an interface 1156 for defining relevant features of the memory to be stored, such as for each memory type. In some examples, the memory content may be identified by an input key 1157, such as user inputs, inputs received from other modules 1032, or other relevant information. The memory content may be identified by a memory key 1159 identifying the purpose or category of memory, such as chat history. For either or both the input key 1157, memory key 1159, or memory types generally, the memory size 1158 may be specified. The memory size 1158 may correspond to a number of interactions, a number of tokens used, or another quantitative identification of the information stored. By providing customizable options to how memory is stored or identified, the memory module 1150 may limit the amount of memory or processing power necessary to execute an LLM 1033, functionality module 1032, or a workflow 1030.

Figure 20:
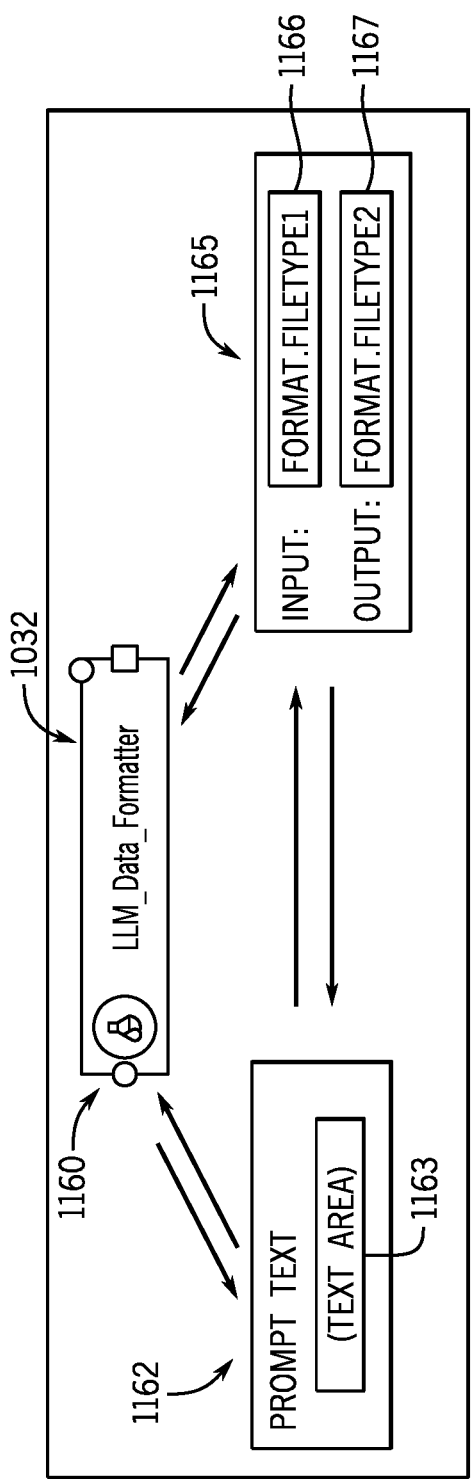
FIG. 20 illustrates an example block diagram and user interface of a large language model data formatter functionality module.

FIG. 20 depicts an example LLM data formatter 1160. The LLM data formatter 1160 may be an LLM 1033 or define a call to an LLM 1033 to translate a file or information from a first format 1166 to a second format 1167. In one example, the LLM data formatter 1160 is a call to the language bridge 1062 of the shared memory 1060. The LLM data formatter 1160 may include a prompt interface 1162 to receive natural text at a text area 1163 to specify the requested first format 1166 and the second format 1167, or to identify the data to be translated or converted. In some examples, the data formatter 1160 includes an interface 1165 where the first format 1166 and the second format 1167 may be specified, such as from a menu.

Figure 21:
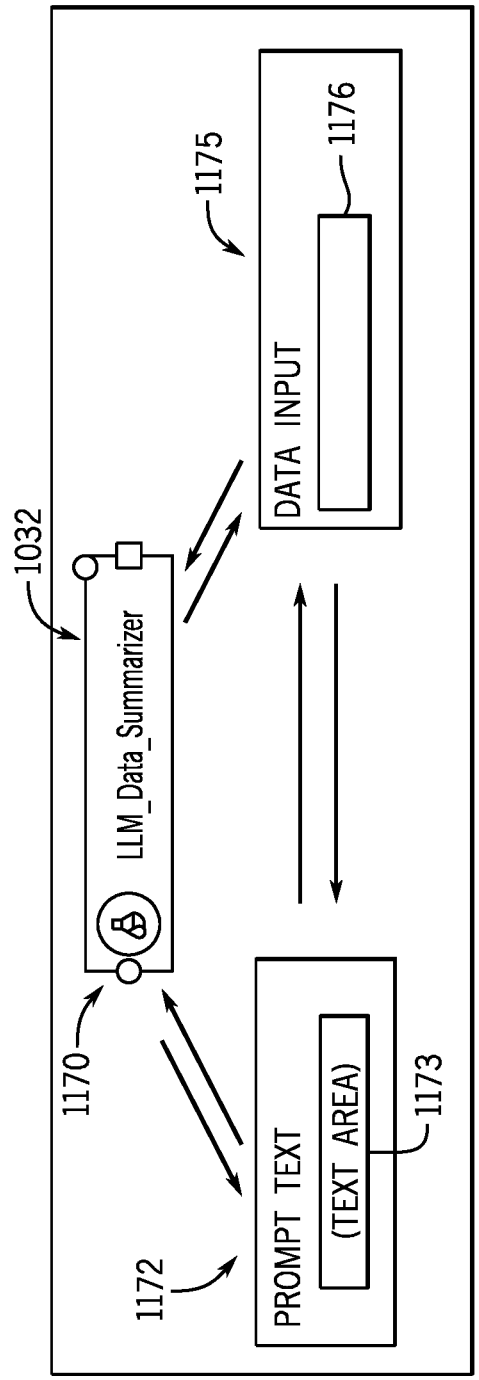
FIG. 21 illustrates an example block diagram and user interface of a large language model data summarizer functionality module.

FIG. 21 depicts an example LLM data summarizer module 1170. The summarizer module 1170 may summarize larger groups of data or information into usable, manageable, or relevant information. For example, large blocks of text may be summarized to reduce data or memory demands while maintaining the tone or other key features relevant to an operation. The summarizer module 1170 may include customizable properties, such as by a prompt interface 1172 to receive natural text 1173 describing key features or content to be summarized, maintained, or removed. In some examples, the summarizer module 1170 may include a data input interface 1175 to input or receive the text or data to be summarized. For example, the data interface 1175 may include a second text area 1176 or a feature to upload and analyze a file. The data summarizer 1170 may be or represent an LLM 1033, or generate calls to an LLM 1033.

Figure 22:
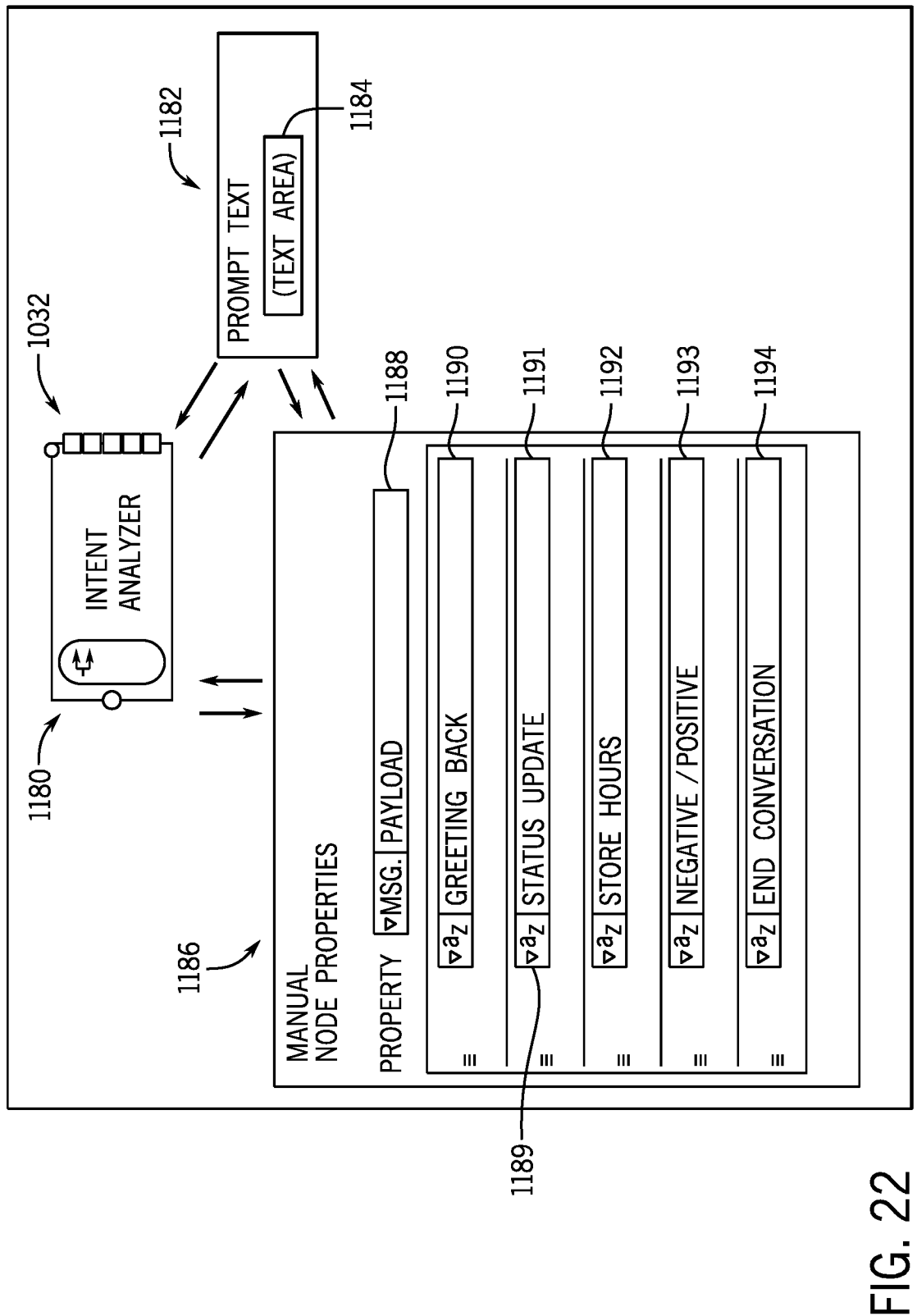
FIG. 22 illustrates an example block diagram and user interface of an intent analyzer functionality module.

FIG. 22 depicts an example intent analyzer functionality module 1180. The intent analyzer module 1180 may be used to redirect or combine a user's interactions with an LLM 1033 or system 100 with a predetermined response or an interaction with a human operator. Because generative AI or LLMs 1033 generate responses may generate new content based on previous interactions, the exact flow or direction of an interaction with an LLM 1033 may not be predictable or precisely controlled. For example, the same response may not be generated for two different inputs 1023 or from identical inputs 1023 received at different times. For some interactions or workflows 1030, predictable responses may be useful to direct the interaction or ensure consistent communications between interactions or users. The intent analyzer module 1180 may allow a developer to specify a predetermined response or range of responses based off a detected intent, e.g. the type, category, or information of a received input 1023, without defining an exhaustive list of terms or phrases to detect the intent. When an input 1023 is received, the intent analyzer 1180 may parse or determine whether the input 1023 for content indicative of the intent is included in the input 1023. If the relevant intent is detected, the intent analyzer 1180 may generate the predetermined response or redirect the interaction to a human operator. After generation of the predetermined response, or responses from a human operator, the intent analyzer 1180 may pass the interaction back to an LLM 1033 or into the workflow 1030 for continued interaction.

The customizable properties of the intent analyzer module 1180 may include a prompt interface 1182 to define one or more predetermined responses. For example, the prompt interface 1182 may include a text area 1184 to receive a natural text input defining the predetermined response. The predetermined responses may be entirely predefined, such as a form response. In some examples, the predetermined response may predefine a portion or category, where each response may provide a range (e.g. varying or slightly different) information containing predefined features. By providing a text area 1184 to define the predetermined response, a developer may specify an intent, or conditions associated with an intent, a high level that trigger a predetermined response. An LLM 1033 associated with the module 1180 may then identify inputs 1023 that correspond to the intent or conditions and generate the predetermined response.

The customizable properties of the intent analyzer module 1033 may include a manual node properties interface 1186, displaying the existing predetermined responses or displaying selectable predetermined responses (e.g. previously defined predetermined responses). The example predetermined responses in FIG. 22 may relate to an intent analyzer 1180 used in a workflow 1030 defining one or more chatbot. The manual node properties interface 1186 may identify the properties 1188 of the input 1023 intended to be analyzed. In one example, the properties 1188 may identify the payload or body of a message as the relevant portion of the input 1023 to analyze. In some examples, the property 1188 may be a type of or an individual user, a country or location, a time, or other categories that may be useful in determining whether a predetermined response is needed.

The manual node properties interface 1186 may include drop down menus 1189 to select existing predetermined responses. For example, the predetermined responses may include a greeting back response 1190 to generate a response to any greetings received in an input 1123, thereby mimicking an interaction with a human operator. By ensuring a similar greeting, a company having a signature or trademarked greeting may ensure the generation of greeting back response 1190. The predetermined responses may be a status update response 1191. For example, it may be important to ensure certain information is included in a status update 1191, such as a date and time, in a request for the status of an order or reservation. The predetermined response interface 11186 may include a response to a request for store hours 1192. For example, a company may desire that any request for store hours includes not only the day requested, but all days or upcoming days. In some examples, the predetermined response may be based on whether a negative or positive intent is detected. In such an example, a negative or positive response 1193 may be generated. For example, if negative intent is determined a response with a conciliatory tone or offer to speak with a human operator may be generated. In some examples, a positive intent may be matched with a tone expressing or mirroring excitement. In some examples, a predetermined response may be a response defining an end of a conversation 1194. For example, a company may have a signature sign off, or offer thanks for the interaction.

The combination and range of predetermined responses, or identified topics to trigger a hand off to a human operator, may allow for the deployment of adaptable solutions. Further, both operator and user interactions may be limited to necessary topics, freeing up both to more quickly arrive at solutions or avoid lengthy wait times. While description is given for example predetermined responses related to messaging or chatbots systems, the interaction may relate to and the intent analyzer 1180 may be used in a messaging system, analyzing data, or any other process completed by a workflow 1030.

Figure 23:
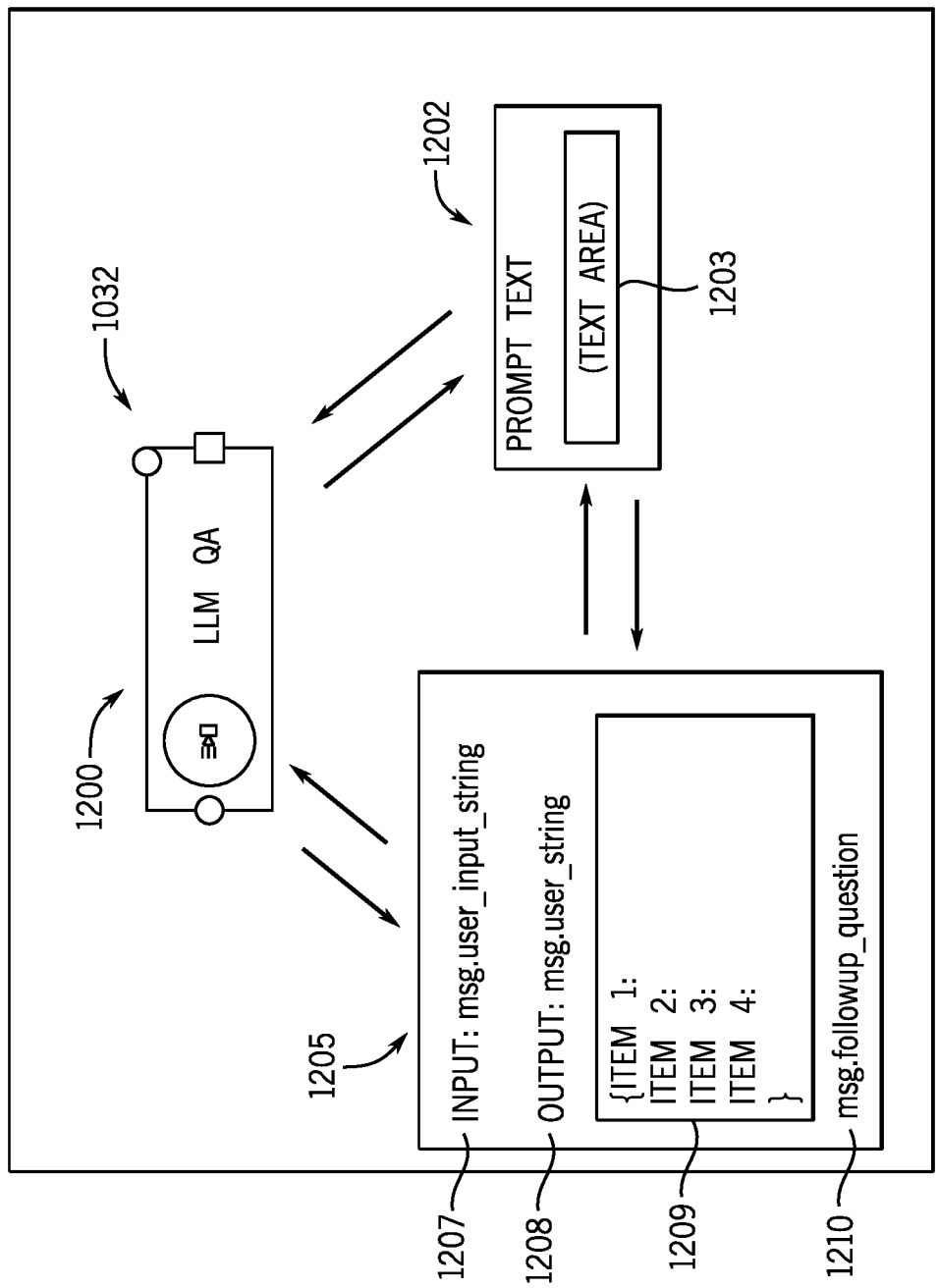
FIG. 23 illustrates an example block diagram and user interface of a large language model question answer (QA) functionality module.

FIG. 23 depicts an example LLM question answer (QA) module 1200. During operation of a workflow 1030 or a system 1000, certain types or pieces of information may be required to complete a task. In some examples, the components of the workflow 1030 or system 1000, such as a second functionality module 1032, may require information in a certain order or structured format. Further, users may commonly provide unnecessary or incomplete information when responding to a prompt requesting the information. The QA module 1200 may determine if the response to the prompt contains necessary the items of information for an operation. The QA module 1200 may also organize the information into a structured format by reordering, categorizing, formatting, or removing information. For example, the QA module 1200 may turn an unstructured input into a structured output. In the event the response to the prompt to a user does not include the necessary information, the QA module 1200 may issue a follow up question 1210 requesting the information.

The QA module 1200 may include a prompt interface 1202 including a text area 1203 to receive a natural language text defining an intended order or structured format 1209 of the information. The natural language text may also specify the type or content of a prompt to requesting initial information. The natural language text may be used to define or outline one or more follow up questions 1210 to request missing information. For example, a prompt 1205 may be generated that identifies the format or type of input to be received 1207. The prompt 1205 may also indicate both the output 1208 type (e.g. file type or format), or the necessary content 1209 of the output 1208. In the event the received information is incomplete (e.g. lacking some of the necessary content 1209), or requires clarification, the prompt 1205 may include or generate one or more follow up questions 1210. In a specific example, a developer may input to the text area 1203, "Please ask for the requested event date and organize the information into the Day, Month, Year, and Time. If any of the information is missing, request that information be provided in a new prompt." The QA module 1200 may then generate, or call to an LLM 1033 to generate, the prompt and necessary information to receive a response to the prompt. After deployment, the QA module 1200 may then parse a user input 1023 to determine or identify the relevant information.

By providing functionality modules 1032 including one or more customizable properties, solutions may be deployed by developers quickly and with less skill or understanding of the underlying code base. The customization of properties of LLMs 1033, or interactions with LLMs 1033, may also result in more efficient or accurate systems for an intended purpose.

The foregoing description, for purposes of explanation, uses specific nomenclature to provide a thorough understanding of the described embodiments. However, it will be apparent to one skilled in the art that the specific details are not required to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system comprising:
a processing element operable to execute a workflow;
a shared memory configured to store a language bridge; and
one or more memories configured to store:
at least one large language module (LLM) executable in a first operational environment, the at least one LLM comprising a first LLM executable in the first operational environment;
at least one LLM executable in a second operational environment, the at least one LLM comprising a second LLM executable in the second operational environment, the second operation environment differing from the first operational environment; and machine readable instructions, that when executed by the processing element, cause operations to be performed, the operations comprising:

receiving at least two functionality modules into the workflow, the at least two functionality modules comprising a first functionality module comprising the first LLM and a second functionality module comprising the second LLM, wherein the first functionality module is received in a first container executing the first operational environment and the second functionality module is received in a second container executing the second operational environment that differs from the first operational environment; and transmitting, by the first functionality module and the second functionality module, communications to the shared memory and accessing, by the first functionality module and the second functionality module, communications from the shared memory, wherein the language bridge is configured to translate the communications between a first programming language of the first operational environment and a second programming language of the second operational environment and the communications comprise commands.

2. The system of claim 1, wherein:
the system is configured to generate a workflow user interface;
the workflow user interface is configured to provide drag and droppable nodes graphically representing the workflow; and
the workflow user interface represents the first functionality module as a first node and the second functionality module as a second node.

3. The system of claim 2, wherein the workflow user interface comprises one or more selectable filters or properties defining a characteristic of at least one of the first LLM or the second LLM.

4. The system of claim 1, wherein:
the one or more memories are configured to further store source data;
the source data is initially stored in a natural language format; and
the system is configured to automatically convert the source data to numerical format and store the source data in the numerical format in a vector database.

5. The system of claim 4, wherein the first LLM is configured to filter information from the source data responsive to a received input.

6. The system of claim 1, wherein:
the first programming language comprises first machine readable instructions;
the second programming language comprises second machine readable instructions;
the first machine readable instructions are incompatible with the second machine readable instructions; and
the language bridge is configured to store and translate the communications between the first machine readable instructions and the second machine readable instructions.

7. The system of claim 1, wherein the first functionality module is configured to generate a user interface displayable at a user device, the user interface configured to receive an input from the user device.

8. The system of claim 1, wherein:
the first functionality module is configured to generate an output that is received as an input at the second functionality module; and
the one or more memories are configured to store further machine readable instructions for receiving, into the workflow, a messaging object, the messaging object configured to pass the output from the first functionality module in the first container to the input of the second functionality module in the second container.

9. The system of claim 1, wherein the shared memory is configured to further store:
two or more virtual environments; and
two or more conflicting libraries, wherein the two or more conflicting libraries are separately stored in the two or more virtual environments.

10. A method comprising:
generating a workflow user interface displayable at a user device, the workflow user interface including nodes representative of large language models or functionality modules;
receiving, from the workflow user interface, a first node into the executable workflow, the first node representing a first large language model;
receiving, from the workflow user interface, a second node into the executable workflow, the second node representing a second large language model;
receiving, from the workflow user interface, a connector into the executable workflow, the connector connecting an output of the first node to an input of the second node, the connector representing a messaging object; and
automatically loading a language bridge to a shared memory accessible by the first large language model and the second large language model, the first large language model and the second large language model each configured to transmit communications to the shared memory for translation between a first programming language associated with the first large language model and a second programming language associated with the second large language model by the language bridge and access stored and translated communications processed by the language bridge from the shared memory, the communications comprising at least one of commands or data.

11. The method of claim 10, wherein:
the first large language model operates in a first operational environment;
the second large language model operates in a second operational environment, the first operational environment incompatible with the second operational environment; and
the language bridge is configured to translate the communications between the first programming language of the first operational environment and the second programming language of the second operational environment.

12. The method of claim 10, further comprising:
uploading source data to a system executing the workflow; and
automatically converting the source data into one or more vectors stored in a vector database, the vector database accessible by either or both of the first large language model or the second large language model.

13. The method of claim 12, further comprising training either of the first large language model or the second large language model with the vector database.

14. The method of claim 10, further comprising:
generating an output by the first large language model; and
transmitting, via the messaging object, the output to an input of the second large language model.

15. The method of claim 10, further comprising after receiving, from the workflow user interface, the first node representing the first large language model, automatically determining if the shared memory includes the language bridge.

16. The method of claim 10, further comprising after receiving, from the workflow user interface, the second large language model, automatically determining if the shared memory includes the language bridge.

17. A system comprising:
a processing element;
a shared memory configured to store a language bridge and communications comprising commands; and
one or more memories configured to store:
a large language model (LLM); and
instructions, that when executed by the processing element, cause operations to be performed, the operations comprising:
receiving, from a user device, a customizable functionality module for the workflow, the customizable functionality module comprising the LLM;
transmitting, to the user device, a user interface configured to receive one or more customizable properties associated with the customizable functionality module;
receiving, from the user device, a customizable property associated with the LLM; and
transmitting, by the customizable functionality module, first communications of a first programming language to the shared memory for storage and processing by the language bridge and accessing stored second communications of a second programming language processed by the language bridge from the shared memory, wherein the processing by the language bridge comprises translating commands of the first communications to the second programming language and translating commands of the second communications to the first programming language.

18. The system of claim 17, wherein:
the LLM is a first LLM executing in a first operational environment associated with the first programming language; and
the one or more memories are configured to further store a second LLM executing in a second operational environment associated with the second programming language, the second operational environment differing from the first operational environment; and
the one or more memories are configured to further store instructions for:
receiving, from the user device, a functionality module for the workflow, the functionality module comprising the second LLM; and
transmitting, by the functionality module, the second communications to the shared memory for storage and processing by the language bridge and accessing the first communications processed by the language bridge from the shared memory.

19. The system of claim 17, wherein:
the customizable functionality module comprises a large language model intent analyzer; and
the large language model intent analyzer is configured to:
analyze an input for an intent to determine a detected intent; and
generate a predetermined response based on the detected intent, wherein the predetermined response is a message generated by the LLM.

20. The system of claim 17, wherein:
the customizable functionality module comprises a question answer module; and
the question answer module is configured to:
identify content of a first input;
compare the content to a list of information to determine information that is not included in the content; and
generate a prompt requesting a second input that includes the information.

* * * * *